United States Patent
Wondra et al.

(10) Patent No.: US 11,128,491 B2
(45) Date of Patent: Sep. 21, 2021

(54) NETWORK LAYER PERFORMANCE AND SECURITY PROVIDED BY A DISTRIBUTED CLOUD COMPUTING NETWORK

(71) Applicant: CLOUDFLARE, INC., San Francisco, CA (US)

(72) Inventors: Nicholas Alexander Wondra, Savoy, IL (US); Achiel Paul van der Mandele, Austin, TX (US); Alexander Forster, Austin, TX (US); Eric Reeves, Austin, TX (US); Joaquin Madruga, Austin, TX (US); Rustam Xing Lalkaka, San Francisco, CA (US); Marek Przemyslaw Majkowski, Warsaw (PL)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 16/993,181

(22) Filed: Aug. 13, 2020

(65) Prior Publication Data
US 2021/0051044 A1    Feb. 18, 2021

Related U.S. Application Data

(60) Provisional application No. 62/886,314, filed on Aug. 13, 2019.

(51) Int. Cl.
*G06F 15/16* (2006.01)
*H04L 12/46* (2006.01)
*H04L 29/12* (2006.01)

(52) U.S. Cl.
CPC ...... *H04L 12/4633* (2013.01); *H04L 61/6018* (2013.01)

(58) Field of Classification Search
None
See application file for complete search history.

(56) References Cited

U.S. PATENT DOCUMENTS

| 6,779,051 | B1 * | 8/2004 | Basil | H04L 12/4633 370/401 |
| 8,955,112 | B2 | 2/2015 | Nguyen et al. | |
| 9,450,981 | B2 | 9/2016 | Doron et al. | |

(Continued)

FOREIGN PATENT DOCUMENTS

WO    WO-2015003391 A1 *   1/2015   ......... H04L 41/0803

*Primary Examiner* — Phyllis A Book
(74) *Attorney, Agent, or Firm* — Nicholson De Vos Webster & Elliott LLP

(57) ABSTRACT

A GRE tunnel is configured between multiple computing devices of a distributed cloud computing network and a single origin router of the origin network. The GRE tunnel has a first GRE endpoint that has an IP address that is shared among the computing devices of the distribute cloud computing network and a second GRE endpoint that has a publicly routable IP address of the origin router. A first computing device receives an IP packet from a client that is destined to an origin server. The first computing device processes the received IP packet and encapsulates the IP packet inside an outer packet to generate a GRE encapsulated packet whose source address is the first GRE endpoint and the destination address is the second GRE endpoint. The GRE encapsulated packet is transmitted over the GRE tunnel to the single origin router.

21 Claims, 14 Drawing Sheets

(56) References Cited

U.S. PATENT DOCUMENTS

| | | |
|---|---|---|
| 10,341,379 B2 | 7/2019 | George et al. |
| 10,574,691 B2 | 2/2020 | Shapira et al. |
| 2007/0153782 A1* | 7/2007 | Fletcher .............. H04L 61/2567 |
| | | 370/389 |
| 2015/0350069 A1* | 12/2015 | Padgett ............... H04L 43/0811 |
| | | 370/236 |
| 2016/0127148 A1* | 5/2016 | Xue .................... H04L 12/4633 |
| | | 370/254 |
| 2017/0019428 A1* | 1/2017 | Cohn .................. H04L 65/1036 |
| 2017/0366577 A1* | 12/2017 | Shapira ............... H04L 63/0236 |
| 2019/0268247 A1* | 8/2019 | Bristow ................... H04L 41/12 |
| 2019/0288941 A1* | 9/2019 | Filsfils .................... H04L 69/22 |
| 2019/0319871 A1* | 10/2019 | Indiresan .............. H04L 45/586 |
| 2020/0412576 A1* | 12/2020 | Kondapavuluru .. H04L 12/4633 |

\* cited by examiner

NETWORK LAYER PERFORMANCE AND SECURITY PROVIDED BY A DISTRIBUTED CLOUD COMPUTING NETWORK

CROSS-REFERENCE TO RELATED APPLICATIONS

This application claims the benefit of U.S. Provisional Application No. 62/886,314, filed Aug. 13, 2019, which is hereby incorporated by reference.

FIELD

Embodiments of the invention relate to the field of networking; and more specifically, to network layer performance and security provided by a distributed cloud computing network.

BACKGROUND

On-premises networks such as enterprise networks are conventionally expensive and require several pieces of hardware. To protect against a distributed denial-of-service (DDoS) attack, many enterprises pick between performance and security when deploying IP network services that direct traffic to a small number of "scrubbing centers" or rely on on-premises hardware. On-premises networks typically involve purchasing, operating, and maintaining network function specific hardware equipment such as hardware load balancers, firewalls, DDoS mitigation equipment, WAN optimization, and other hardware. Each hardware component costs time and money to maintain and makes the network harder to manage. Thus, conventional network services are expensive; they require high capital outlays, investment in staff to operate, and ongoing maintenance to stay functional.

Generic Routing Encapsulation (GRE) is a type of tunneling protocol commonly used to deliver traffic across intermediary networks. For example, consider a corporation that has users and servers in a main office and users in a remote office. The servers have IP addresses that users in the main office can access because they are on the same network. However, users in the remote office are on a different network that is separated from the main office by the internet. A GRE tunnel can be established between the router in the main office and the router in the remote office such that the users in the remote office can access the servers in the main office by their local IP addresses. Effectively, the remote office router is configured such that when it receives IP packets from users in the remote office that are destined to IP addresses of the main office, the router wraps those IP packets in encapsulating IP headers plus a GRE header, where the encapsulated packet's destination IP address is the IP address of the router of the main office. When the router of the main office receives the encapsulated packet, it strips off the encapsulating IP header and GRE header and re-issues the original IP packet back into its local network. A similar procedure is followed for traffic from the main office to the remote office.

GRE is typically a stateless protocol. Any IP packet can be encapsulated independently, and any encapsulated packet can be decapsulated independently. There is an extension to GRE which adds sequencing similar to TCP sequence/acknowledgement numbers; in this extension configuration, GRE is not stateless. GRE is sometimes referred to as a "point-to-point" protocol because the configuration of each tunnel endpoint is typically done on a single device, often a router.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
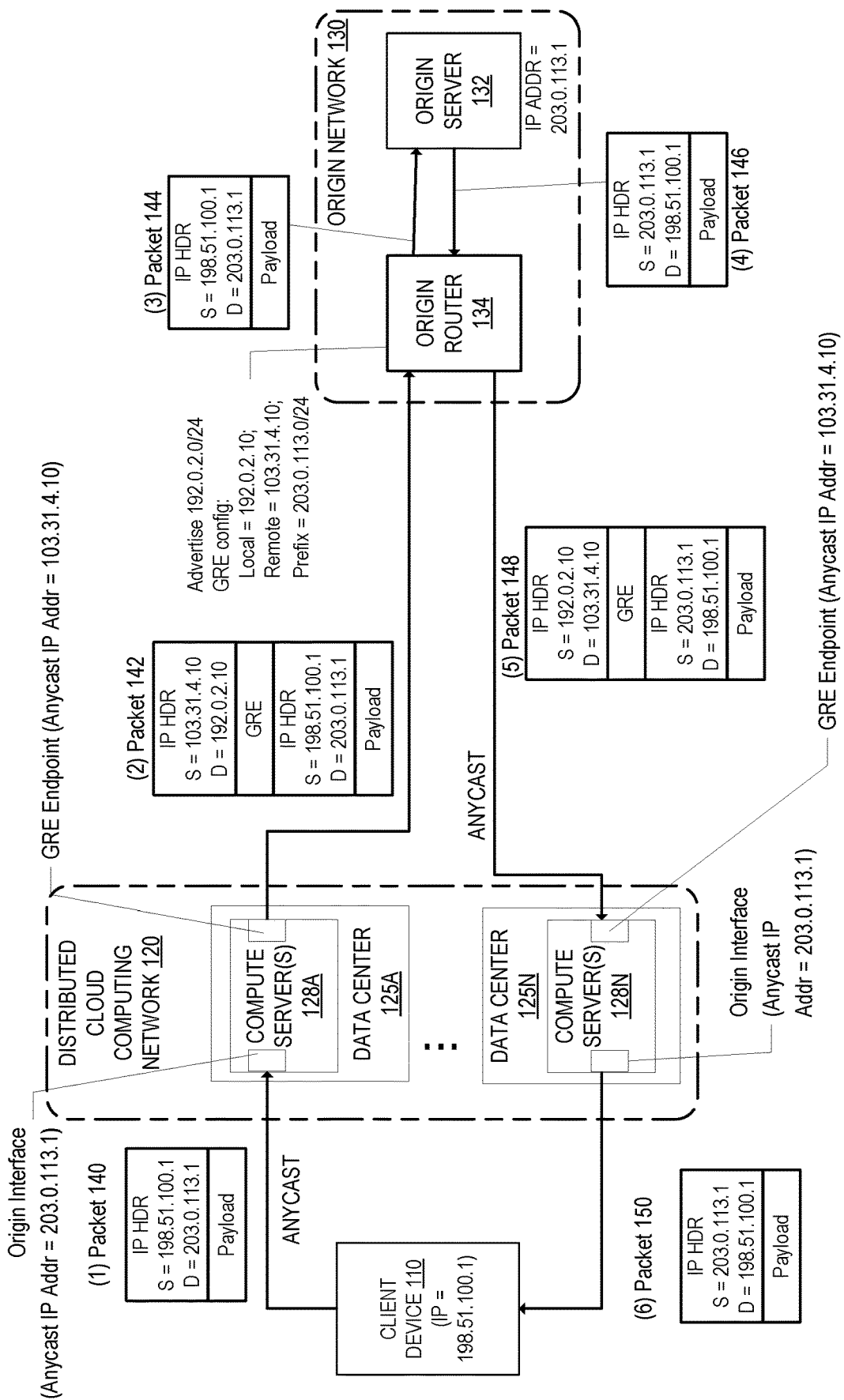
FIG. 1 illustrates an exemplary system for network layer performance and security provided by a distributed cloud computing network according to an embodiment.

Network layer performance and security provided by a distributed cloud computing network is described. The distributed cloud computing network is available as a service over the internet and does not require customers (e.g., origin owners and/or operators) to install additional hardware or software to support the service. The distributed cloud computing network includes multiple data centers that are geographically distributed. There may be hundreds to thousands of data centers, for example. Each data center includes one or more compute servers. Each data center can also include one or more DNS servers (e.g., one or more authoritative name servers, one or more proxy DNS servers), and/or one or more other pieces of network equipment such as router(s), switch(es), and/or hubs. In an embodiment, each edge server within a data center may process network layer traffic (e.g., HTTP/S, SPDY, FTP, TCP, UDP, IPSec, SIP, other IP protocol traffic, or other network layer traffic). The description herein will use IP as an example of the network layer. However, other network layer protocol types may be used in embodiments described herein.

IP traffic destined to an origin network is received at the distributed cloud computing network instead of being received initially at the origin network. For instance, in an embodiment, IP address(es) of the origin network are advertised (e.g., using Border Gateway Protocol (BGP)) by the distributed cloud computing network instead of being advertised by the origin network. This causes IP traffic to be received at the distributed cloud computing network instead of being received at the origin network. The IP address(es) of the origin network may be advertised by each of the data centers as anycast IP address(es) such that IP traffic destined to those IP address(es) are at least initially received at the data center that is closest to the transmitting device in terms of routing protocol configuration (e.g., BGP configuration) according to an anycast implementation as determined by the network infrastructure (e.g., router(s), switch(es), and/or other network equipment between the transmitting device and the data centers. In another embodiment, the data centers advertise a different set of anycast IP address(es) on behalf of the origin and map those anycast IP address(es) to the origin IP address(es). In either embodiment, IP traffic destined for the origin is routed to one or more of the data centers. This effectively means that all of the network locations of the distributed cloud computing network, and the network capacity of the distributed cloud computing network, are available to the origin network.

The distributed cloud computing network can provide one or more performance services and/or one or more security services that do not require customers to install additional hardware or software to support the service. The one or more performance services can include a content delivery network, caching, video delivery, website optimizations (e.g., asynchronous loading, image optimizations, mobile optimizations), load balancing, intelligent routing, availability, and/or protocol management (e.g., IPv4/v6 gateway). The one or more security services can include DDoS protection, secure session (SSL/TLS) support, web application firewall, threat blocking, privacy protection, access control, compliance, and/or rate limiting. The performance services and security services described above are examples and the distributed cloud computing network may perform different services than described. In an embodiment, each performance service and/or security service can be performed in each data center. Thus, without installing additional hardware or software, a customer can deploy in front of their on-premises network the distributed cloud computing network that can protect their on-premises network from DDoS attack and/or enables provisioning of a full suite of virtual network functions including advanced packet filtering, load balancing, and traffic management tools. In an embodiment, the performance services and/or security services that apply to a particular IP packet and/or IP address may be configured by the customer. For instance, a customer can configure which service(s) to apply to which IP address(es) and/or type of IP packet received.

IP packets destined for the origin network are received at the distributed cloud computing network and can be inspected for attacks, filtered, steered, accelerated, and/or sent onward to the origin network. Connectivity between the distributed cloud computing network and the origin network may be supported over tunneling protocols (e.g., Generic Routing Encapsulation (GRE) tunnels, IPsec tunnels, etc.), private network interconnects (PNI), or other forms of peering. The distributed cloud computing network offers full-duplex, bidirectional IP connectivity to the internet with transit provided by the distributed cloud computing network.

FIG. 1 illustrates an exemplary system for network layer performance and security provided by a distributed cloud computing network according to an embodiment. The system includes the distributed cloud computing network 120. The distributed cloud computing network 120 includes multiple data centers 125A-N. There may be hundreds to thousands of data centers, for example. The data centers 125A-N are geographically distributed (e.g., throughout the world). The data centers 125A-N include one or more compute server(s) 128A-N respectively. Each data center 125 can also include one or more control servers, one or more DNS servers (e.g., one or more authoritative name servers, one or more proxy DNS servers), and/or one or more other pieces of network equipment such as router(s), switch(es), and/or hubs. In an embodiment, each compute server 128 within a data center 125 may process IP traffic (e.g., HTTP/S, SPDY, FTP, TCP, UDP, IPSec, SIP, or other IP protocol traffic). The data centers 125A-N are connected across the public internet.

The system also includes the origin network 130 that includes the origin server 132 and the origin router 134. The origin network 130 is the origin for IP traffic of a customer of the distributed cloud computing network 120. The origin network 130 may be connected to one or more of the compute server(s) 128A-N of the data centers 125A-N. In the example of FIG. 1, the origin server 132 has the IP address 203.0.113.1. The data centers 125A-N receive IP traffic for the origin server 132. In an embodiment, the data centers 125A-N receive the IP traffic destined for the origin server IP address (e.g., 203.0.113.1) because the data centers 125A-N advertise the IP prefix of the customer (as anycast) instead of the origin network advertising the IP prefix. In another embodiment, the data centers 125A-N advertise a different anycast IP address on behalf of the origin and map that different anycast IP address to the origin IP address. In either embodiment, IP traffic destined for the origin is routed to one or more of the data centers 125A-N.

Figure 2:
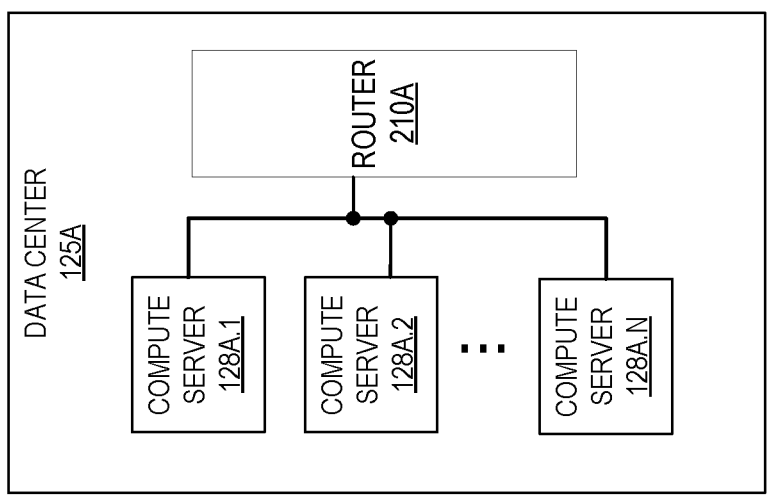
FIG. 2 illustrates an example architecture of a data center according to an embodiment.

FIG. 2 illustrates an example architecture of a data center 125 according to an embodiment. The data center 125A includes the compute servers 128A.1-128A.N that are each connected to the router 210A. Each of the compute servers 128A.1-128A.N may be separate physical devices or may be virtual instances running on one or more separate physical devices. Each different compute server 128A.1-128A.N may be assigned a different IP address. The compute servers 128A.1-128A.N may form an ECMP group. In an embodiment, the router 210A externally advertises the IP prefix of the origin network instead of the origin network advertising the IP prefix, and the compute servers 128A.1-128A.N advertise the IP prefix of the origin network to the router 210A. The router 210A receives IP packets destined for the origin network 130. The router 210A determines one of the compute servers 128A.1-128A.N to which it will transmit the received IP packet. In an embodiment, the compute servers 128A.1-128A.N form an ECMP group and the router 225A divides the traffic between the compute servers 128A.1-128A.N. In another embodiment, a layer 4 load balancing is used to distribute traffic among the compute servers 128A.1-128A.N.

The particular data center 125 that receives a particular IP packet from a client device may be determined by the network infrastructure according to an Anycast implementation or by a geographical load balancer. For instance, the data centers 125A-N may each advertise the same anycast IP address. An IP packet with a destination IP address of that anycast IP address will be received at the data center that is closest to the client device in terms of routing protocol configuration (e.g., Border Gateway Protocol (BGP) configuration) according to an anycast implementation as determined by the network infrastructure (e.g., router(s), switch(es), and/or other network equipment) between the requesting client device and the data centers.

The data center 125 that receives the IP packet from the client device 110 will process the packet. The packet may be directed to a compute server 128 of the data center 125 for processing. The processing may include performing one or more of performance services and/or one or more security services. The one or more performance services can include a content delivery network, caching, video delivery, website optimizations (e.g., asynchronous loading, image optimizations, mobile optimizations), load balancing, intelligent routing, availability, and/or protocol management (e.g., IPv4/v6 gateway). The one or more security services can include DDoS protection, secure session (SSL/TLS) support, web application firewall, threat blocking, privacy protection, access control, compliance, and/or rate limiting. The performance services and security services described above are examples and the distributed cloud computing network 120 may perform different services than described. In an embodiment, each performance service and/or security service can be performed in each data center 125. In an embodiment, the one or more security services are continually performed while in other embodiments the one or more security services are performed on-demand.

In an embodiment, the content delivery network service may include caching content at the data centers 125A-N (e.g., the distributed cloud computing network 120) to deliver content faster with less latency. In addition, when static content is cached in the geographically distributed network of data centers, the availability of the static content can be maintained even when the origin server fails or goes down. In an embodiment, content caching is based on rules that specify particular behavior for individuals URLs and/or IP addresses, including what content gets cached and how long the content remains cached. Traffic can be load balanced across multiple origins, using proximity and network latency to determine the most efficient destination for each content request. In an embodiment, content is placed on dedicated IP ranges, allowing for prioritized routing and protection.

The content delivery network service may include video delivery services. In an embodiment, the video delivery services provide high quality video streaming through a bundled platform that combines storage, transcoding, distribution and playback functionalities.

In an embodiment, caching service can include automatic static content caching, cache purging, and tiered caching. As noted above, static content caching can conserve CPU resources and bandwidth providing static content from the geographically distributed network of data centers. In an embodiment, cache purging services using cache-tags stored as metadata with cached objects allows for purging an entire cache or a single file. In an embodiment, using tiered caching, content served from adjacent data centers can reduce cache-miss rates, server load, and end-to-end latency.

Website optimization services can include asynchronous resource loading, image optimizations, and mobile optimizations. Asynchronous resource loading can allow multiple resources (e.g., images, scripts, etc.) to be loaded simultaneously rather than sequentially. Image optimizations can include resizing images from a single-source image master based on a type of user device and a connection speed. Images can be manipulated by dimensions (e.g., screen size), compression ratios, and format (e.g., WebP conversion where supported). Image optimizations can also include applying both "lossless" and "lossy" image optimizations to remove unnecessary bytes from images. Mobile optimizations can include detecting a browser type of a user device and optimizing performance for the particular type of user device. This can improve the performance of images when a website is accessed via a mobile connection.

The load balancing services may provide local and global load balancing to reduce latency by load balancing traffic across multiple servers or by routing traffic to the closest geolocation region. For example, requests for dynamic content are sourced from origin servers that are either closest to the user or meet specific weighted requirements.

The load balancing services may also provide health checks of servers with fast failover to rapidly route users away from failing servers. For example, through periodic HTTP/HTTPS requests, monitoring can be configured for specific URLs with customizable intervals, timeouts, and status codes. Availability monitoring can check the health of origin servers (e.g., as often as every 15 seconds), with reporting via email notifications and a REST API. Thus, when an origin server is marked as unhealthy, multi-region failover can route or reroute traffic to the next available healthy server.

Network congestion and unreliable connections can result in slow load times of websites. To address this issues, intelligent routing services can use real-time network intelligence to route traffic through the fastest network paths, while maintaining open, secure connections to eliminate latency imposed by connection-setup. For example, based on network conditions, requests can be routed to avoid congested network paths and/or unreliable connections.

Protocol management services include an IPv4-to-IPv6 translation gateway that can allow any website to be available over IPv6 even when a site's origin network does not yet support the IPv6 protocol. In an embodiment, services that require IPv4 support can use a Pseudo IPv4 service, where an HTTP header is added to requests established over IPv6 with a "pseudo" IPv4 address. In such an embodiment, using a hashing algorithm, Pseudo IPv4 will create a Class E IPv4 address which will produce the same output for the same input; the same IPv6 address will result in the same Pseudo IPv4 address.

A DDoS detection and mitigation service detects and mitigates against DDoS attacks. DDoS attack may be identified in several ways that may be different based on the type of attack. Many DDoS attacks involve sending a large amount of traffic of a certain type to an intended target. The DDoS detection may determine when there is an abnormal amount of traffic that is destined to a particular destination (e.g., the traffic spikes from what is normally encountered). The DDoS detection may sample and analyze the traffic looking for inconsistencies and establish a threshold amount of what the normal traffic rate is for a domain and/or IP address and determine when traffic exceeds that threshold. Traffic rates may be individual and separate for a compute server and/or data center and a DDoS attack may be identified for ach separate compute server and/or data center; or a DDoS can be identified through an aggregation of traffic across all compute servers and data centers. By way of a specific example, a DDoS attack may be detected by using one or more parameters that exceed a threshold, including one or more of the following to a particular IP address and/or domain: the number of packets, the amount of bandwidth, the number of User Datagram Protocol (UDP) packets/second, the number of Transmission Control Protocol (TCP) packets/second, the number of connections opened, the number of failed connections, and the ratio of successfully opened connections versus failed connections. These are just examples as there may be other parameters used in combination with, or in lieu of, the above to detect a DDoS attack. For example, the distributed cloud computing network 120 may detect if a domain and/or IP address is unreachable due to a heavy load, which may be an indication of a DDoS attack. As another example, the detection of a spike in metrics pertaining to a page or a resource request may be an indication of a DoS attack (e.g., a particular request header, cookie, size of the request, non-standard control characters, a large number of GET parameters, a large number of POST parameters, etc.). The DDoS mitigation may create rules to filter packets that meet certain criteria and install them in a firewall for dropping the packets.

Secure session support services (e.g., Secure Socket Layer (SSL) and Transport Layer Security (TLS) support) may be provided that allow for SSL to operate in different modes depending on the level of security required and the amount of user configuration. For example, a flexible secure session service encrypts traffic from the distributed cloud computing network 120 to a client device, but not from the distributed cloud computing network 120 to an origin server, while a full secure session service encrypts the traffic from the distributed cloud computing network 120 to the origin server and the client device.

Web application firewall services can run in real-time to prevent automated attacks, SQL injection, XSS javascript injections and other real-time POST actions (e.g., cross-site scripting, cross-site forgery requests, etc.). The web application firewall services can contain rules to thwart attacks commonly seen in popular applications, including: WordPress, Magento, Drupal, PHP, Joomla, etc. In an embodiment, web application firewall services allows an administrator to import their own rules and write custom rules, as well as utilize system-generated rules that are automatically updated when new security vulnerabilities are identified or detected.

Threat blocking and privacy protection security services can include reputation-based threat protection that block known malicious threats, comment spam protection that block spammers from posting on a website, and content scraping protection that protect content (e.g., text, images, email addresses) from web scrapers. Threat blocking security services can also block or present challenges to users by country, IP address, or autonomous system number. Threat blocking security services can also provide user agent blocking to allow a user to create a rule to block or challenge a specific User Agent from accessing a domain, or a zone lockdown to allow the whitelisting of specific IP addresses and IP ranges.

Access control security services can include multi-user access, role-based access, and single sign-on support. Multi-user access allows an administrator to invite other users to manage the account as an administrator. In an embodiment, invited administrators can have full control over the account except for managing members and changing billing information. Role-based access enables organizations to collaborate across one account, and use roles-based permissions to control access. In an embodiment, each user is assigned an individual API key and can use two-factor authentication to protect their own account. Single sign-on support allows for centralized identity and access management by allowing owners to setup and define who can access their accounts with their chosen identity provider.

Access control security services can also enable a user or administrator to monitor user access and change logs. For example, the system can log recent logins, access requests, and policy changes, and provide information indicating affected users, associated IPs, domains, actions taken, and timestamps.

Payment Card Industry Data Security Standards (PCI DSS) is a set of security standards designed to ensure that businesses that accept, process, store, or transmit credit card information maintain a secure environment. In an embodiment, by enabling web application firewall and Modern TLS Only mode ensures that a business remains in compliance with the latest PCI DSS standards.

DDoS attacks can be difficult to mitigate when they originate from a large number of unique IP addresses and mimic legitimate traffic. Rate limiting services can protect against such DDoS attacks, as well as protect sensitive information against brute-force login attempts and other types of abusive behavior. In an embodiment, rate limiting provides the ability to configure thresholds, define responses, and obtain information about specific URLs of websites, applications, or API endpoints. Examples of thresholds can include allowing a certain number of requests per minute from each unique IP address, a certain number of login attempts, etc. Example response configurations can include enable mitigating actions (e.g., challenges or CAPTCHAS), response codes, etc. Implementation of rate limiting service can reduce bandwidth usage by eliminating unpredictable traffic spikes or attacks.

In an embodiment, the processing functions and/or services that are performed by the compute server may be different depending on the packet and/or configuration for the destination origin. For instance, the data centers 125A-N may advertise an IP prefix (or group of IP addresses) instead of the origin network where some of the IP addresses may be for different services such as load balancing, HTTP servers, mail servers, or other custom-based applications. Thus, different IP addresses of an origin network may have different security and/or traffic management requirements. In an embodiment, the distributed cloud computing network 120 receives configuration (e.g., from the origin owner or operator) that specifies one or more IP addresses and the services and/or functions to apply to those IP address(es), and applies that configuration when determining what processing functions and/or services to apply. For example, the customer may define certain configurations for routing, firewalls, and/or other services. As an example, an origin owner or operator may provide a configuration for the following: packets destined for a set of IP address(es) that contain HTTP services that were traditionally fronted by a traditional hardware load balancer instead be processed by a load balancing service provided by the distributed cloud computing network 120; HTTP traffic destined to the set of IP address(es) be processed with a web application firewall service provided by the distributed cloud computing network 120; and content be cached by the distributed cloud computing network 120.

As another example, the compute server may identify an IP packet that would benefit from bidirectional flow processing (e.g., Layer 4 and/or Layer 7 processing that may require state of the packet to be stored) and cause the packet to be processed accordingly. For instance, the compute server may identify the IP packet as a TCP packet, terminate the connection and re-establish the TCP connection with the origin network 130. In this case, the IP address of the compute server may be the source IP address of the packet instead of the client device. This will be described in greater detail with respect to FIG. 4.

In an embodiment, the distributed cloud computing network 120 includes one or more control servers that are operated by the service. The control server(s) provide a set of tools and interfaces for the customers and is accessible over the Internet. For example, the control server(s), among other things, allow the customer to configure the performance services and/or security services including specifying one or more IP addresses and the services and/or functions to apply to those IP address(es). The control server(s) can also configure other settings for the performance services and/or security services (e.g., create/apply firewall rules, caching functions, image optimization settings, load balancing settings, mobile device settings, threat protection, DDoS management/trigger, rate limiting rules, etc.). The settings can be selectively applied to one or more of their IP addresses, pages, and/or resources.

In an embodiment, the processing functions and/or services that are performed by the compute server for a particular IP packet may be different depending on a set of one or more parameters associated with that IP packet such as: the class of service of the packet, and the threat data associated with the source IP address and/or destination IP address of the packet. The parameter(s) may be used to make a decision on the packet such as dropping the packet.

Connectivity between the distributed cloud computing network 120 and the origin network 130 may be supported over tunneling protocols (e.g., GRE tunnels, IPsec tunnels, etc.), private network interconnects (PNI), or other forms of peering. In an embodiment where the data centers 125A-N advertise the IP address of the origin (instead of the origin advertising that IP address), the IP packet cannot simply be transmitted to that destination IP address because it will then be received again by the distributed cloud computing network 120. Instead, in an embodiment, the IP packet is transmitted over an overlay network over the public Internet to the origin network. For instance, the IP packet may be transmitted over the public internet over a GRE tunnel, IPsec tunnel, or other tunnel. The description below refers to GRE tunnels, however other forms of encapsulation can be used (e.g., IPsec tunnels, VPN tunnels, IP in IP, SIT/IPv6, OpenVPN, Secure Socket Tunneling Protocol (SSTP), Layer 2 Tunneling protocol (L2TP), Virtual Extensible Local Ara Network (VXLAN), etc.).

In an example, a single GRE tunnel with the same endpoints is configured between each of the compute server(s) 128A-N of the data centers 125A-N and the origin network 130 (e.g., the origin router 134 of the origin network 130). The GRE endpoints at the compute server(s) 128A-N may use the same anycast IP address to terminate the GRE tunnel. A router in each of the data centers 125A-N may advertise the same anycast IP address and the compute server(s) 128A-N are configured to accept traffic directed to that same anycast IP address and advertise that same anycast IP address to the router. The GRE endpoint at the origin network 130 is generally a publicly routable IP address for the origin network 130. Since the GRE endpoints at the compute server(s) 128A-N of the data centers 125A-N use the same anycast IP address to terminate the GRE tunnel, each of the compute server(s) 128A-N of the data centers 125A-N are able to receive traffic over the GRE tunnel from the origin network 130. A single GRE tunnel configuration on the side of the origin network 130 effectively establishes a GRE tunnel with each of the compute server(s) 128A-N, which eliminates the requirement to configure multiple GRE tunnels with different data centers 125A-N. Thus, a single GRE tunnel is effectively shared between each of the compute server(s) 128A-N and the origin network 130. Any of the compute server(s) 128A-N can be removed from production or fail, and a different one of the compute server(s) 128A-N is still able to receive the GRE traffic from the origin network 130. Also, any of the data centers 125A-N can be removed from production or fail, and the next closest data center to the origin network 130 will start receiving the GRE traffic from the origin network 130. Thus, no single compute server or single data center 125A-N is a single point of failure. Although an embodiment has been described where GRE tunnels are configured between the compute server(s) 128A-N and the origin network 130 (e.g., the origin router 134), in an alternative embodiment GRE tunnels are configured between a router of each data center 125A-N and the origin network 130 (e.g., the origin router 134). However, performing the GRE encapsulation/decapsulation on the compute server(s) 128A-N instead of routers of the data centers 125A-N reduces the compute overhead on the routers and may provide better scaling.

In an embodiment, multiple GRE tunnels may be configured between the data centers 125A-N and the origin network 130. For instance, although FIG. 1 shows one origin router 134, the origin network 130 may include multiple origin routers for redundancy and/or load balancing. As another example, the origin network 130 may have multiple locations where a set of tunnel(s) are established between the data centers 125A-N and origin router(s) of the first location and a set of tunnel(s) are established between the data centers 125A-N and origin router(s) of a second location, and so on. In an embodiment, a BGP peering session is established with the origin network 130 and BGP announcements are used that specify which GRE tunnel(s) traffic is to be sent. In another embodiment, an API is exposed for the customer to specify which GRE tunnel(s) traffic is to be sent.

In the example of FIG. 1, a GRE tunnel is operatively configured between each of the compute server(s) 128A-N and the origin router 134. Each of the compute server(s) 128A-N are configured with a local GRE endpoint having the same anycast IP address and a remote GRE endpoint having a publicly routable IP address of the origin router 134. The origin router 134, in turn, is configured with a local GRE endpoint of its publicly routable IP address and a remote GRE endpoint of the anycast IP address of the compute server(s) 128A-N. With respect to FIG. 1, the compute server(s) 128A-N each have a local GRE endpoint having an anycast IP address of 103.31.4.10 and a remote GRE endpoint having an IP address of 192.0.2.10. The origin router 134 is configured with a local GRE endpoint having the IP address 192.0.2.10 and a remote GRE endpoint with the anycast IP address 103.31.4.10.

Return packets (those sent from the origin network 130 and ultimately destined for the client device 110) may be sent back through the GRE endpoints (e.g., in embodiments where direct server return is not used). If sent back through the GRE endpoints, the origin router 134 encapsulates the return IP packet with a destination IP address of the GRE endpoint of the compute server(s) 128A-N. Since the GRE endpoint for the compute server(s) 128A-N is an anycast IP address, the particular data center 125 of the data centers 125A-N that receives the encapsulated IP packet is the one closest to the origin router 134 according to an anycast implementation as determined by the network infrastructure between the origin router 134 and the data centers 125A-N.

Since an anycast IP address of the GRE endpoint may be used (as well as an anycast IP address of the origin), the particular data center 125 from which an encapsulated IP packet was transmitted to the origin network 130 may not necessarily be the same data center 125 that receives the return encapsulated IP packet from the origin network 130. For instance, consider a situation where a data center 125 exists in California, a data center 125 exists in England, the origin network 130 is in Paris, and the client device 110 is located in Oregon. An IP packet sent by the client device 110 will likely be received and processed by a compute server 128 of the data center 125 in California since it is closer to Oregon than the data center 125 in England. A compute server 128 of the data center 125 in California processes the IP packet and if determines to send to the origin network 130, encapsulates the IP packet and transmits the encapsulated IP packet to the origin router 134 in Paris. The origin router 134 decapsulates the IP packet and transmits it to the origin server 132 for processing. Assuming that the origin server 132 transmits a return IP packet that is received by the origin router 134, the origin router 134 encapsulates a return IP packet that has the destination IP address of the anycast IP address of the GRE endpoint of the compute server(s) 128A-N. Since it is an anycast IP address and it was sent by the origin router 134 in Paris, that return packet will likely be received by the data center 125 in England versus the data center 125 in California. Thus, in this example, the IP packet was sent from a different data center 125 than the data center 125 that received the return IP packet. The data center 125 that receives the return IP packet processes the packet and transmits it back towards the client device (in some cases the return IP packet may pass through multiple data centers 125 to transmit to the client device 110).

In an embodiment, the distributed cloud computing network 120 includes one or more control servers that are operated by the service. The control server(s) provide a set of tools and interfaces for the customers and is accessible over the Internet. For example, the control server(s), among other things, allow the customer to configure the performance services and/or security services including specifying one or more IP addresses and the services and/or functions to apply to those IP address(es). The control server(s) can also configure other settings for the performance services and/or security services (e.g., create/apply firewall rules, caching functions, image optimization settings, load balancing settings, mobile device settings, threat protection, DDoS management/trigger, rate limiting rules, etc.). The settings can be selectively applied to one or more of their IP addresses, pages, and/or resources.

Figure 3:
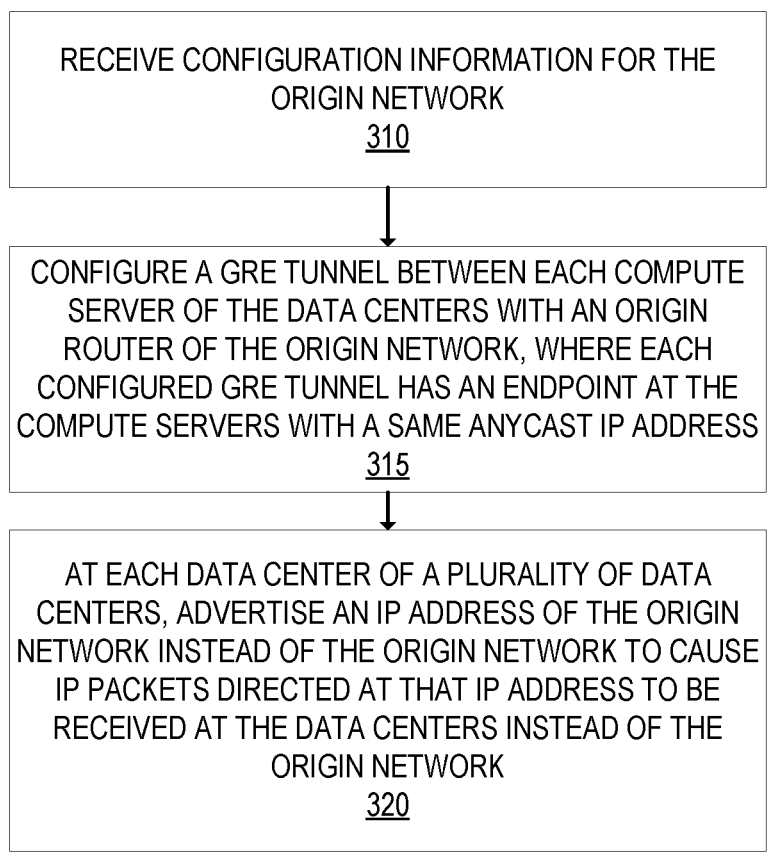
FIG. 3 is a flow diagram that illustrates exemplary operations for establishing the network layer performance and security service provided by the distributed cloud computing network according to an embodiment.

FIG. 3 is a flow diagram that illustrates exemplary operations for establishing the network layer performance and security service provided by the distributed cloud computing network 120 according to an embodiment. At operation 310, a control server that is operated by the service receives configuration information from a customer for establishing the network layer performance and security service for an origin network. The configuration information may indicate which IP address(es) the distributed cloud computing network 120 should advertise, network information of the origin network (e.g., IP addresses of the origin router(s) used for GRE tunnels), information specifying which GRE tunnel(s) traffic is to be sent, configuring the performance services and/or security services including specifying one or more IP addresses and the services and/or functions to apply to those IP address(es), and/or configuration for other settings for the performance services and/or security services (e.g., create/apply firewall rules, caching functions, image optimization settings, load balancing settings, mobile device settings, threat protection, DDoS management/trigger, rate limiting rules, etc.). The configuration information may be communicated from the control server to the data centers 125A-N.

Next, at operation 315, a GRE tunnel is configured between each of the compute server(s) 128A-N of the data centers 125A-N and the origin router 134 of the origin network 130. The configured GRE tunnels have the same endpoint at the compute sever(s) 128A-N that use the same anycast IP address to terminate the GRE tunnel. The configured GRE tunnels also have the same endpoint at the origin router 134 (e.g., using the IP address of the GRE tunnel for the origin router 134). A router in each of the data centers 125A-N may advertise the same anycast IP address and the compute server(s) 128A-N are configured to accept traffic directed to that same anycast IP address and advertise that same anycast IP address to the router.

Next, at operation 320, IP address(es) of the origin network 130 are advertised at each of the data centers 125A-N instead of being advertised by the origin network 130 to cause IP packets directed at those IP address(es) to be initially received at the data centers 125A-N instead of the origin network 130.

With reference to FIG. 1, the client device 110 (having an IP address of 198.51.100.1) transmits the IP packet 140 at operation 1. The client device 110 is a computing device (e.g., desktop, laptop, tablet, mobile phone, smartphone, gaming system, set-top box, Internet of Things (IoT) device, wearable device, etc.) that is capable of accessing network resources through a client network application (e.g., a browser, a mobile application, or other network application). The IP packet 140 is destined to the origin server 132 (e.g., it includes a destination IP address of 203.0.113.1). The IP packet 140 may be any type of IP packet (e.g., HTTP/S, SPDY, FTP, TCP, UDP, IPsec, SIP, or other IP protocol). The IP packet 140 is received at the data center 125A of the distributed cloud computing network 120. The data center 125A receives the IP packet 140 because it is the closest data center 125 of the data centers 125A-N to the client device 110 according to an Anycast implementation.

The data center 125A processes the IP packet 140. In an embodiment where the data center 125A includes multiple compute servers, the IP packet 140 is sent to one of those compute servers for processing. The multiple compute servers may form an equal-cost multi-path (ECMP) group and a router of the data center 125A may determine which compute server will process the IP packet 140. The processing may include performing one or more performance and/or one or more security services as previously described. In an embodiment, if it is determined that the IP packet 140 is to be transmitted to the origin network 130, the compute server 128A of the data center 125A encapsulates the IP packet 140 inside an outer GRE packet as shown in the encapsulated packet 142, and transmits the encapsulated packet 142 to the origin router 134 at operation 2. The outer source and destination IP addresses of the outer GRE packet correspond to the GRE tunnel endpoints. Thus, the IP address of the GRE endpoint of the compute server 128A (103.31.4.10) is the source IP address of the outer GRE packet, and the IP address of the GRE endpoint of the origin router 134 (192.0.2.10) is the destination IP address of the outer GRE packet. The inner IP packet may be the same as shown in packet 142. As an example, the payload of the packet 140 and the payload of the inner IP packet of the encapsulated packet 142 may be different because the processing stage may modify the payload. The packet 142 may traverse multiple other network equipment (e.g., internet nodes) along the route to the origin router 134.

The origin router 134 decapsulates the packet 142 (removes the outer GRE packet) and transmits the IP packet 144 to the origin server 132 at operation 3. The origin server 132 will process the packet 144 and may transmit a return packet 146. If so, the return packet 146 is received by the origin router 134 at operation 4. The return packet 146 has a source IP address of the origin server 132 (203.0.113.10) and a destination IP address of the client device 110 (198.51.100.1).

In an embodiment, the origin router 134 is configured to transmit outgoing IP packets over the overlay network over the public internet to the distributed cloud computing network 120. For instance, the origin router 134 is configured to transmit outgoing IP packets over the public internet over a GRE tunnel to the distributed cloud computing network 120. As illustrated in FIG. 1, the origin router 134 encapsulates the IP packet 146 inside an outer GRE packet as shown in the encapsulated packet 148. The outer source and destination IP addresses of the outer GRE packet correspond to the GRE tunnel endpoints. Thus, the IP address of the GRE endpoint of the origin router 134 (192.0.2.10) is the source IP address of the outer GRE packet, and the anycast IP address 103.31.4.10 is the destination IP address of the outer GRE packet. The origin router 134 transmits the encapsulated packet 148 at operation 5. Since the destination IP address of the outer GRE packet is an anycast IP address (announced by each of the data centers 125A-N), the data center 125 that is closest to the origin router 134 (according to the anycast implementation) will receive the encapsulated packet 148. In the example of FIG. 1, the data center 125N receives the encapsulated packet 148 because it is the closest data center 125 of the distributed cloud computing network 120 to the origin router 134. Although FIG. 1 shows a different data center 125 receiving the return encapsulated packet, the same data center 125 may transmit the encapsulated IP packet and receive a return encapsulated IP packet if it is also the closest data center to the origin router 134.

The data center 125N receives the encapsulated packet 148 and decapsulates the packet (removing the outer GRE packet). For instance, the router of the data center 125N receives the encapsulated packet 148 and sends it to one of the compute server(s) 128N for processing. If there are multiple compute servers in the data center 125N, one of the compute servers is selected (e.g., based on a load balancing algorithm or based on ECMP selection). The compute server 128N decapsulates the encapsulated packet 148 and processes the decapsulated packet. Processing the packet may include performing one more performance services and/or one or more security services on the packet. Assuming that the compute server 128N determines to transmit the packet to the client device 110, the compute server 128N transmits the decapsulated IP packet 150 to the client device 110. The IP packet 146 is the same as the IP packet 150 unless the compute server 128N modified the packet during processing.

Although FIG. 1 shows an embodiment where the origin router 134 transmits outgoing IP packets over an overlay network over the public internet to the distributed cloud computing network 120, in another embodiment the origin router 134 performs direct server return and instead transmits return packets directly to the client device 110. In such an embodiment, the origin router 134 would transmit the packet 146 over the public internet to the client device 110.

Figure 4:
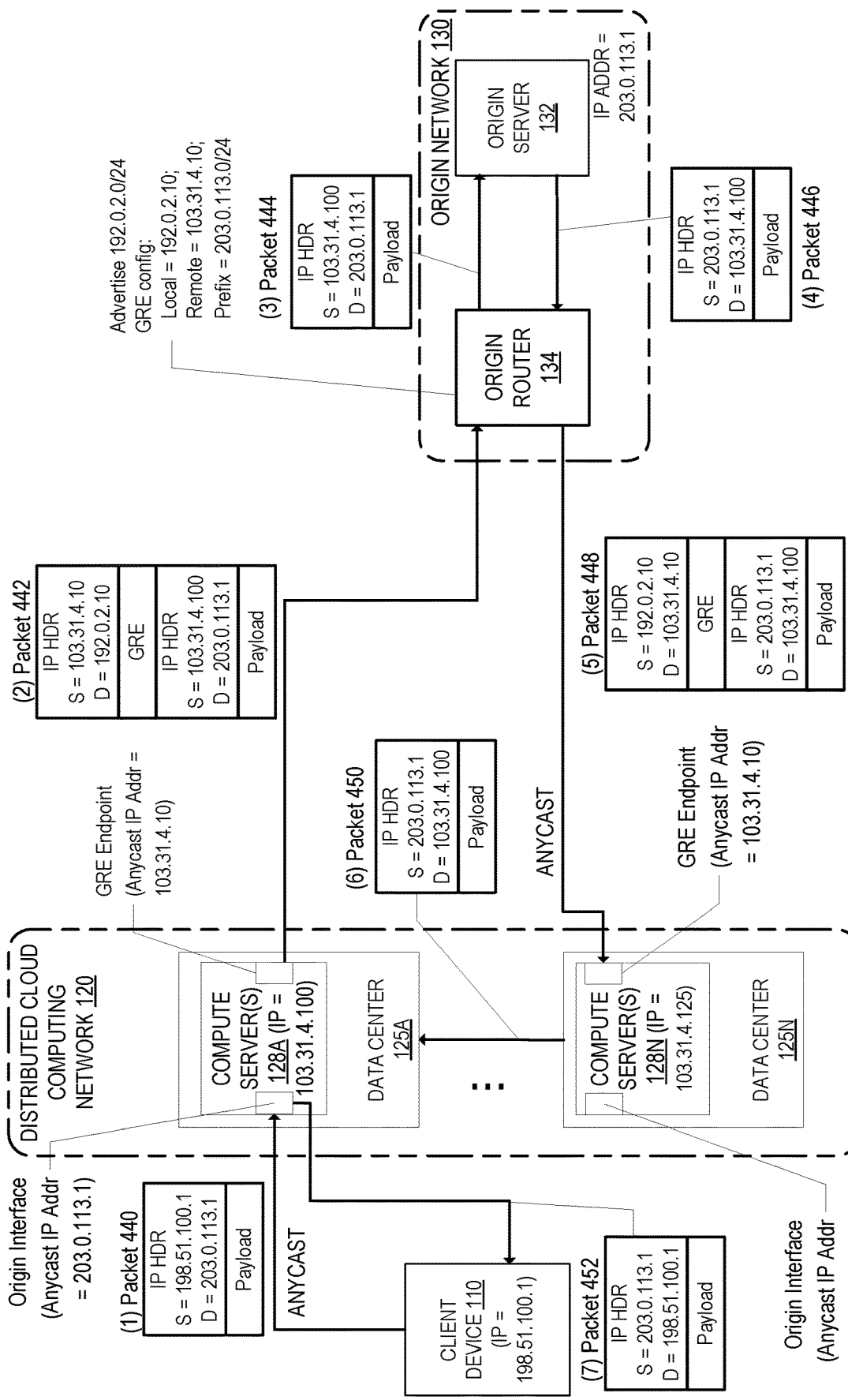
FIG. 4 illustrates an exemplary system for network layer performance and security provided by a distributed cloud computing network according to an embodiment.

FIG. 1 shows an embodiment where it is possible that different data centers 125A may process the incoming packet from a client device and transmit the outgoing packet to the client device. FIG. 4 shows an embodiment where the same data center 125A (and potentially same compute server within the data center 125A) processes the incoming packet and outgoing packet. This may allow applications to provide upper layer processing (e.g., Layer 4 and/or Layer 7 processing) where bidirectional flow (incoming and outgoing) may be needed. For instance, additional features can be provided such as inspection of the contents of connections, rewriting content, adding transport layer security (TLS), etc.

FIG. 4 illustrates an exemplary system for network layer performance and security provided by a distributed cloud computing network according to an embodiment. FIG. 4 is like FIG. 1 where the data centers 125A-N receive IP traffic for the origin server 132, and a GRE tunnel is configured between each of the compute server(s) 128A-N of the data centers 125A-N and the origin network 130 (e.g., the origin router 134 of the origin network 130). The GRE endpoints at the compute server(s) 128A-N use the same anycast IP address to terminate the GRE tunnel. Each of the compute server(s) 128A-N are configured with a local GRE endpoint having the same anycast IP address and a remote GRE endpoint having a publicly routable IP address of the origin router 134. The origin router 134, in turn, is configured with a local GRE endpoint of its publicly routable IP address and a remote GRE endpoint of the anycast IP address of the compute server(s) 128A-N. With respect to FIG. 4, the compute server(s) 128A-N each have a local GRE endpoint having an anycast IP address of 103.31.4.10 and a remote GRE endpoint having an IP address of 192.0.2.10. The origin router 134 is configured with a local GRE endpoint having the IP address 192.0.2.10 and a remote GRE endpoint with the anycast IP address 103.31.4.10.

At operation 1, the client device 110 (having an IP address of 198.51.100.1) transmits the IP packet 440. The IP packet 440 is destined to the origin server 132 (e.g., it has a destination IP address of 203.0.113.1). The IP packet 440 may be any type of IP packet (e.g., HTTP/S, SPDY, FTP, TCP, UDP, IPsec, SIP, or other IP protocol). The IP packet 440 is received at the data center 125A of the distributed cloud computing network 120. Like FIG. 1, the data center 125A receives the IP packet 440 because it is the closest data center 125 of the data centers 125A-N to the client device 110 according to an Anycast implementation.

The data center 125A processes the IP packet 440. In an embodiment where the data center 125A includes multiple compute servers, the IP packet 440 is sent to one of those compute servers for processing like described in FIG. 1. The multiple compute servers may form an equal-cost multi-path (ECMP) group and a router of the data center 125A may determine which compute server will process the IP packet 440. The processing may include performing one or more performance and/or one or more security services as previously described.

In the example of FIG. 4, the compute server 128A may have determined that the IP packet 440 would benefit from bidirectional flow. The compute server 128A may terminate the TCP/UDP connection with the client device 110 and establish a TCP/UDP connection with the origin network 130. In an embodiment, the compute server 128A does not preserve the source IP address of the original IP packet 440 and instead uses an IP address of a compute server of the data center 125A (in this case, an address of 103.31.4.100), encapsulates that IP packet inside an outer GRE packet as shown in the encapsulated packet 442, and transmits the encapsulated packet 442 to the origin router 134 at operation 2. The outer source and destination IP addresses of the outer GRE packet correspond to the GRE tunnel endpoints. Thus, the IP address of the GRE endpoint of the compute server 128A (103.31.4.10) is the source IP address of the outer GRE packet, and the IP address of the GRE endpoint of the origin router 134 (192.0.2.10) is the destination IP address of the outer GRE packet. The inner IP packet appears to be sourced from the compute server 128A.

The origin router 134 decapsulates the packet 442 (removes the outer GRE packet) and transmits the IP packet 444 to the origin server 132 at operation 3. The origin server 132 will process the packet 444 and may transmit a return packet 446. If so, the return packet 446 is received by the origin router 134 at operation 4. The return packet 446 has a source IP address of the origin server 132 (203.0.113.10) and a destination IP address of the compute server 128A of the data center 125A.

In an embodiment, the origin router 134 is configured to transmit outgoing IP packets over the overlay network over the public internet to the distributed cloud computing network 120. For instance, the origin router 134 is configured to transmit outgoing IP packets over the public Internet over a GRE tunnel to the distributed cloud computing network 120. As illustrated in FIG. 4, the origin router 134 encapsulates the IP packet 446 inside an outer GRE packet as shown in the encapsulated packet 448. The outer source and destination IP addresses of the outer GRE packet correspond to the GRE tunnel endpoints. Thus, the IP address of the GRE endpoint of the origin router 134 (192.0.2.10) is the source IP address of the outer GRE packet, and the anycast IP address 103.31.4.10 is the destination IP address of the outer GRE packet. The origin router 134 transmits the encapsulated packet 448 at operation 5. Since the destination IP address of the outer GRE packet is an anycast IP address (announced by each of the data centers 125A-N), the data center 125 that is closest to the origin router 134 (according to the anycast implementation) will receive the encapsulated packet 448. In the example of FIG. 4, the data center 125N receives the encapsulated packet 448 because it is the closest data center 125 of the distributed cloud computing network 120 to the origin router 134.

The data center 125N receives the encapsulated packet 448 and decapsulates the packet (removing the outer GRE packet). For instance, the router of the data center 125N receives the encapsulated packet 448 and sends it to one of the compute server(s) 128N for processing. If there are multiple compute servers in the data center 125N, one of the compute servers is selected (e.g., based on a load balancing algorithm or based on ECMP selection). The compute server 128N decapsulates the encapsulated packet 448 and processes the decapsulated packet. The compute server 128N transmits the inner IP packet 450 to its destination at operation 6, which in this case is the compute server 128A in the data center 125A. In an embodiment, the compute server 128N encapsulates the inner IP packet into an encapsulated packet and tunnels the packet to the compute server 128A.

The compute server 128A of the data center 125A receives and processes the packet 450 (including decapsulating if necessary). Since the compute server sees the bidirectional flow of packets, the compute server can perform additional layer 4 and/or layer 7 processing that it otherwise could not do, such as layer 7 filtering including packet inspection to look at the content of the packets for inconsistencies, invalid or malicious commands, and/or executable programs; rewriting content; and adding TLS. Assuming that the compute server 128A within the data center 125A determines to transmit the packet to the client device 110, the compute server 128A of the data center 125A transmits the IP packet 452 (which has been modified to include the source IP address of the origin server 132) to the client device 110 at operation 7.

Although FIG. 4 shows an embodiment where the origin router 134 transmits outgoing IP packets over an overlay network over the public internet to the distributed cloud computing network 120, in another embodiment the origin router 134 performs direct server return. In the case of FIG. 4, since the source IP address of the packet 444 is an IP address of the compute server 128A, the origin router 134 transmits the packet directly to the compute server 128A (e.g., over the public internet). The compute server 128A may then perform processing on the packet as previously described and transmit the packet to the client device 110.

Figure 5:
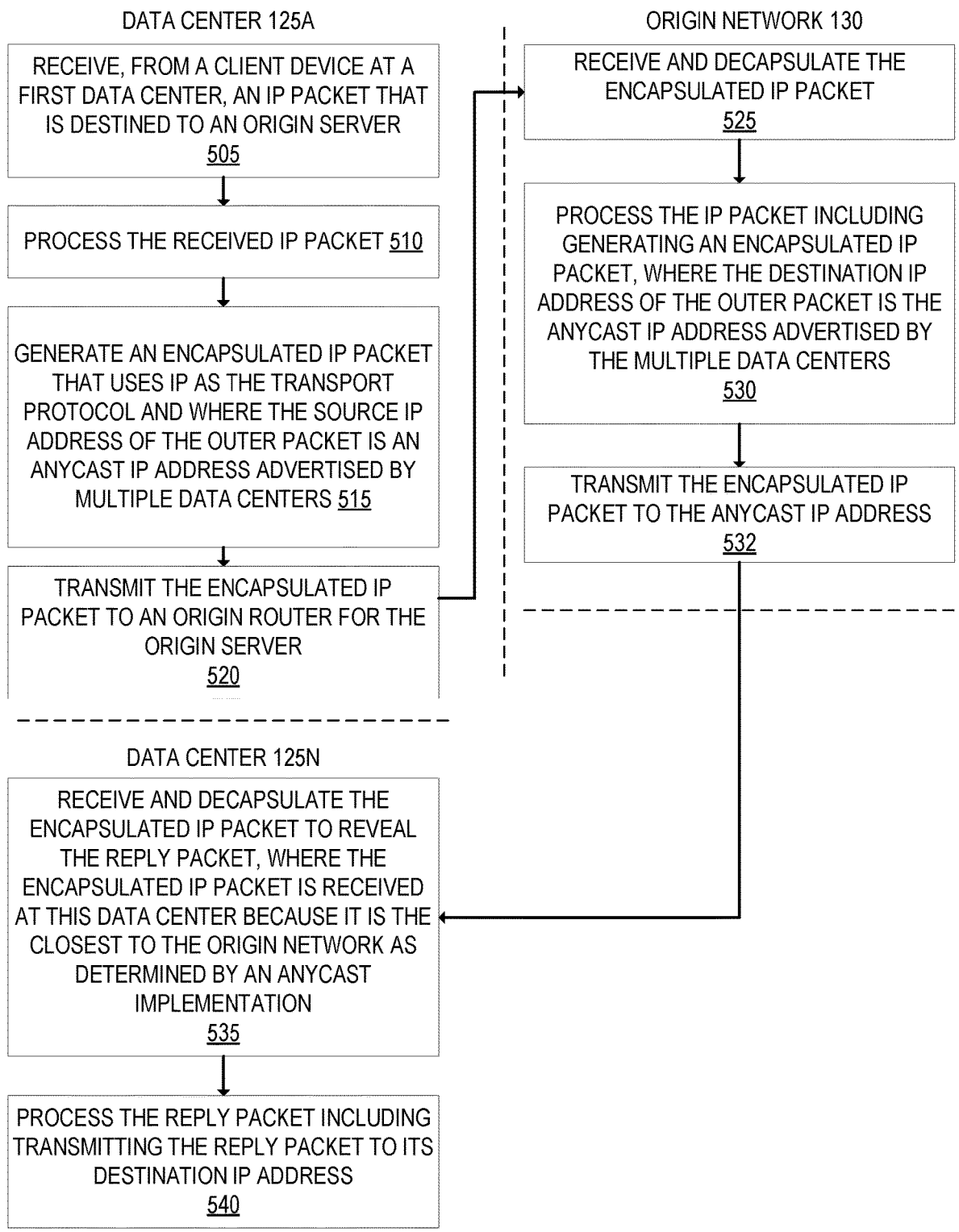
FIG. 5 is a flow diagram that illustrates exemplary operations for a network layer performance and security service provided by a distributed cloud computing network according to an embodiment.

FIG. 5 is a flow diagram that illustrates exemplary operations for a network layer performance and security service provided by a distributed cloud computing network according to an embodiment. The operations of FIG. 5 are described with reference to the exemplary embodiment of FIGS. 1 and 4. However, the operations of FIG. 5 can be performed by embodiments other than those discussed with reference to FIGS. 1 and 4, and the embodiments discussed with reference to FIGS. 1 and 4 can perform operations different than those discussed with reference to FIG. 5.

At operation 505, an IP packet is received from a client device at a first data center 125A of the data centers 125A-N. The IP packet is destined to an IP address that belongs to an origin server. Each of the data centers 125A-N advertise the IP address (or IP address prefix that includes the IP address) as an anycast IP address instead of that IP address being advertised by the origin server. This causes IP packets destined to that IP address to be instead received at one of the data centers 125A-N. The first data center 125A receives the IP packet as a result of an anycast determination that the first data center 125A is closest to the client device out of the data centers 125A-N.

Next, at operation 510, the received IP packet is processed by a compute server 128A of the first data center 125A. In an embodiment, processing the received IP packet includes performing one or more performance services and/or one or more security services as previously described. In an embodiment, the compute server 128A dynamically determines which one or more performance services and/or one or more security services to perform based on information of, or associated with, the IP packet. For instance, a customer may configure which service(s) to apply to which IP address(es) and/or type of IP packet received. The compute server 128A accesses this configuration to determine if and what service(s) to apply to the received packet. Processing the received IP packet may determine that bidirectional flow processing is desired (e.g., the same compute server processing the ingress and egress). The compute server 128A may terminate the TCP/UDP connection with the client device and establish a TCP/UDP connection with the origin network 130. The processing of the packet may be done in multiple stages, as is further described in FIG. 11 for instance.

If it is determined to transmit the IP packet to the origin network, then operation 515 is performed. At operation 515, the compute server 128A generates an encapsulated IP packet that uses IP as the transport protocol. In a specific example, the encapsulated IP packet is a GRE encapsulated IP packet. The inner packet of the encapsulated IP packet is the result of the processed IP packet. The inner packet may have the same source IP address as the packet received from the client device if it is determined that bidirectional flow processing is not needed (e.g., any of the compute servers from any of the data centers may process the return packet), such as shown in packet 142 of FIG. 1. If it is determined that bidirectional flow processing is desired, the inner packet of the encapsulated IP packet may have a source IP address of the compute server 128A instead of the client device, such as shown in packet 442 of FIG. 4. The outer packet of the encapsulated IP packet has a source IP address that is an anycast IP address advertised by each of the compute server(s) 128A-N at each of the data centers 125A-N and can be used as a tunneling endpoint on each of the compute server(s) 128A-N. The outer packet of the encapsulated IP packet as a destination IP address of an IP address of the origin router 134 (e.g., a publicly routable IP address of the origin router 134).

Next, at operation 520, the compute server 128A transmits the encapsulated IP packet to the IP address of the origin router 134. At operation 525, the origin router 134 of the origin network 130 receives and decapsulates the encapsulated IP packet. The origin router 134 transmits the inner packet to the origin server 132 for further processing. The origin server 132 processes the inner packet and may respond with a reply packet. The reply packet is received at the origin router 134. At operation 530, the IP packet is processed including generating an encapsulated IP packet that uses IP as the transport protocol (e.g., a GRE encapsulated IP packet). The inner packet of the encapsulated IP packet is the reply packet from the origin server 132. The inner packet has a source IP address of the origin server 132. The inner packet has a destination IP address that corresponds with source IP address of the inner packet of the encapsulated IP packet sent from the compute server 128A to the origin router 134 (e.g., the destination IP address may be of the client device or the compute server 128A). The outer packet of the encapsulated reply IP packet has a source IP address of the origin router 134 (the tunnel endpoint address of the origin router 134) and has a destination IP address of the anycast IP address (the tunnel endpoint address of the compute server(s) 128A-N. Next, at operation 532, the encapsulated IP packet is transmitted to the anycast IP address of the compute server(s) 128A-N.

As previously described, since the tunnel endpoint for the compute server(s) 128A-N is an anycast IP address, the particular data center 125 of the data centers 125A-N that receives the encapsulated return IP packet at the tunnel endpoint is the one closest to the origin router 134 according to an anycast implementation as determined by the network infrastructure between the origin router 134 and the data centers 125A-N. The operations in FIG. 5 describe this situation. Thus, at operation 535, the encapsulated return IP packet is received at a second data center 125N out of the data centers 125A-N. This return IP packet is received at the data center 125N as a result of an anycast implementation determination that the data center 125N is closest to the origin network 130 out of the data centers 125A-N. A compute server 128N of the data center 125N decapsulates the encapsulated IP packet revealing the inner IP packet (the reply packet from the origin server 132).

Next, at operation 540, the compute server 128N processes the reply packet including transmitting the reply packet to its destination IP address. The destination IP address may be the client device. If so, the compute server 128N may perform processing including performing one or more performance services and/or one or more security services before transmitting the reply packet to the client device. If the destination IP address is a different compute server (e.g., the compute server 128A), the compute server 128N transmits the reply packet to that different compute server for further processing. The compute server 128N may encapsulate the reply packet in an encapsulated IP packet before transmitting to the other compute server. The other compute server will receive the packet, decapsulate if necessary, and process the reply packet including performing one or more performance services and/or one or more security services before transmitting the reply packet to the client device.

FIG. 4 showed an embodiment where the compute server 128A determined that the IP packet would benefit from bidirectional flow and subsequently changed the source IP address of the inner packet to an IP address of the compute server 128A so return packets are directed to that compute server 128A. In another embodiment, bidirectional flow can be achieved without changing the source IP address of the inner packet. For instance, a visitor probability map that provides the likelihood of a particular IP address and/or IP address range being received at a particular data center 125 may be used to determine where the reply packet should be delivered. If the probability that the packet was received at a particular data center 125 exceeds a threshold, the reply packet may be directed to that data center 125. The probability map may be generated based on IP geolocation databases and/or historical analysis of IP addresses and data centers 125 that encountered those IP addresses. For instance, consider a data center 125 in California and a data center 125 in England (anycasted to the same IP address). It is unlikely that traffic from a client device in California would be received at the data center in England, and vice versa. The visitor probability map allows the system to determine, with a degree of accuracy, that a reply packet having a particular destination IP address likely belongs to a flow that was initially processed at a particular data center. In some cases, if no probability exceeds the threshold, the compute server that receives the return packet processes the return packet.

Figure 6:
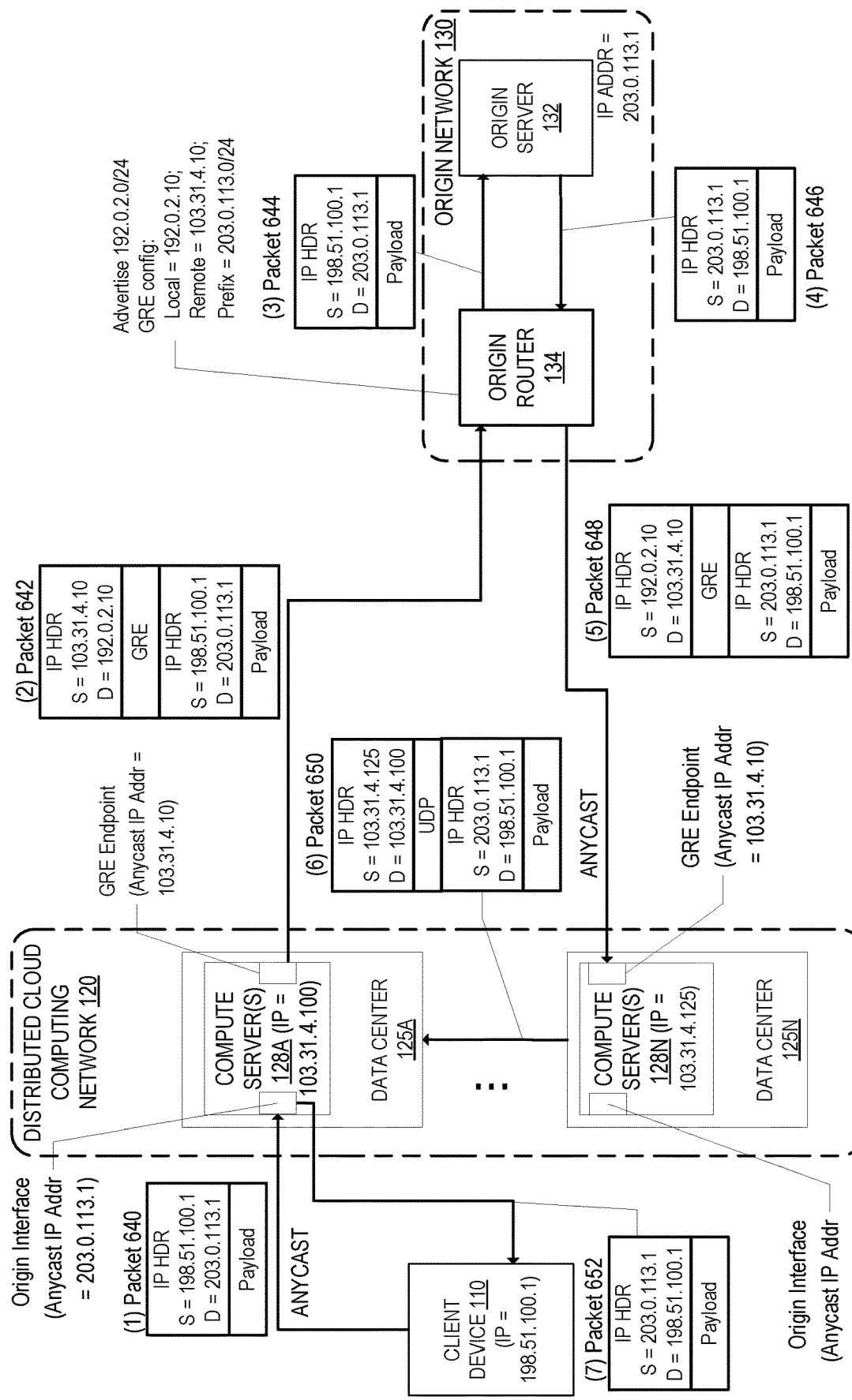
FIG. 6 illustrates an exemplary system for network layer performance and security provided by a distributed cloud computing network according to an embodiment.

FIG. 6 illustrates an exemplary system for network layer performance and security provided by a distributed cloud computing network according to an embodiment. FIG. 6 is like FIG. 4 where the data centers 125A-N receive IP traffic for the origin server 132, and a GRE tunnel is configured between each of the compute server(s) 128A-N of the data centers 125A-N and the origin network 130 (e.g., the origin router 134 of the origin network 130). The GRE endpoints at the compute server(s) 128A-N use the same anycast IP address to terminate the GRE tunnel. Each of the compute server(s) 128A-N are configured with a local GRE endpoint having the same anycast IP address and a remote GRE endpoint having a publicly routable IP address of the origin router 134. The origin router 134, in turn, is configured with a local GRE endpoint of its publicly routable IP address and a remote GRE endpoint of the anycast IP address of the compute server(s) 128A-N. With respect to FIG. 6, the compute server(s) 128A-N each have a local GRE endpoint having an anycast IP address of 103.31.4.10 and a remote GRE endpoint having an IP address of 192.0.2.10. The origin router 134 is configured with a local GRE endpoint having the IP address 192.0.2.10 and a remote GRE endpoint with the anycast IP address 103.31.4.10.

At operation 1, the client device 110 (having an IP address of 198.51.100.1) transmits the IP packet 640. The IP packet 640 is destined to the origin server 132 (e.g., it has a destination IP address of 203.0.113.1). The IP packet 640 may be any type of IP packet (e.g., HTTP/S, SPDY, FTP, TCP, UDP, IPsec, SIP, or other IP protocol). The IP packet 640 is received at the data center 125A of the distributed cloud computing network 120. Like FIG. 4, the data center 125A receives the IP packet 640 because it is the closest data center 125 of the data centers 125A-N to the client device 110 according to an Anycast implementation.

The data center 125A processes the IP packet 640. In an embodiment where the data center 125A includes multiple compute servers, the IP packet 640 is sent to one of those compute servers for processing like described in FIG. 1. The multiple compute servers may form an equal-cost multi-path (ECMP) group and a router of the data center 125A may determine which compute server will process the IP packet 640. The processing may include performing one or more performance and/or one or more security services as previously described.

In the example of FIG. 6, the compute server 128A may have determined that the IP packet 440 would benefit from bidirectional flow. However, unlike the example shown in FIG. 4 where the source IP address of the original IP packet 440 is not used in the inner IP packet (the inner packet used an IP address of the compute server 128A as the source IP address), the inner packet of the encapsulated packet 642 maintains the source IP address of the original IP packet 640. That inner packet is encapsulated inside an outer GRE packet as shown in the encapsulated packet 642, and the compute server 128A transmits the encapsulated packet 442 to the origin router 134 at operation 2. The outer source and destination IP addresses of the outer GRE packet correspond to the GRE tunnel endpoints. Thus, the IP address of the GRE endpoint of the compute server 128A (103.31.4.10) is the source IP address of the outer GRE packet, and the IP address of the GRE endpoint of the origin router 134 (192.0.2.10) is the destination IP address of the outer GRE packet. The inner IP packet continues to appear to be sourced from the client device 110.

The origin router 134 decapsulates the packet 642 (removes the outer GRE packet) and transmits the IP packet 644 to the origin server 132 at operation 3. The origin server 132 will process the packet 644 and may transmit a return packet 646. If so, the return packet 646 is received by the origin router 134 at operation 4. The return packet 646 has a source IP address of the origin server 132 (203.0.113.10) and a destination IP address of the client device 110.

In an embodiment, the origin router 134 is configured to transmit outgoing IP packets over the overlay network over the public internet to the distributed cloud computing network 120. For instance, the origin router 134 is configured to transmit outgoing IP packets over the public Internet over a GRE tunnel to the distributed cloud computing network 120. As illustrated in FIG. 6, the origin router 134 encapsulates the IP packet 646 inside an outer GRE packet as shown in the encapsulated packet 648. The outer source and destination IP addresses of the outer GRE packet correspond to the GRE tunnel endpoints. Thus, the IP address of the GRE endpoint of the origin router 134 (192.0.2.10) is the source IP address of the outer GRE packet, and the anycast IP address 103.31.4.10 is the destination IP address of the outer GRE packet. The origin router 134 transmits the encapsulated packet 648 at operation 5. Since the destination IP address of the outer GRE packet is an anycast IP address (announced by each of the data centers 125A-N), the data center 125 that is closest to the origin router 134 (according to the anycast implementation) will receive the encapsulated packet 648. In the example of FIG. 6, the data center 125N receives the encapsulated packet 448 because it is the closest data center 125 of the distributed cloud computing network 120 to the origin router 134.

The data center 125N receives the encapsulated packet 648 and decapsulates the packet (removing the outer GRE packet). For instance, the router of the data center 125N receives the encapsulated packet 648 and sends it to one of the compute server(s) 128N for processing. If there are multiple compute servers in the data center 125N, one of the compute servers is selected (e.g., based on a load balancing algorithm or based on ECMP selection). The compute server 128N decapsulates the encapsulated packet 648 and processes the decapsulated packet. Since the decapsulated packet has a destination IP address of the client device 110) the data center 125N uses a visitor probability map (e.g., based on the destination IP address) to determine that the ingress data center for the packet flow was likely data center 125A. To transmit the decapsulated IP packet to the data center 125A, in an embodiment the IP packet is encapsulated (e.g., using UDP) for transit between the data center 125N to the data center 125A. For instance, the compute server 128N encapsulates the inner IP packet inside an outer UDP packet as illustrated in the encapsulated packet 650. The outer UDP packet has a source IP address of the compute server 128N and a destination IP address of the compute server 128A. The compute server 128N transmits the encapsulated packet 650 to the compute server 128A for further processing.

The compute server 128A of the data center 125A receives and processes the encapsulated packet 650 including decapsulating the packet to reveal the inner IP packet. Since the compute server 128A sees the bidirectional flow of packets, the compute server 128A can perform additional layer 4 and/or layer 7 processing that it otherwise could not do, such as layer 7 filtering including packet inspection to look at the content of the packets for inconsistencies, invalid or malicious commands, and/or executable programs; rewriting content; and adding TLS. Assuming that the compute server 128A within the data center 125A determines to transmit the packet to the client device 110, the compute server 128A of the data center 125A transmits the IP packet 652 to the client device 110 at operation 7.

Although FIG. 6 shows an embodiment where the origin router 134 transmits outgoing IP packets over an overlay network over the public internet to the distributed cloud computing network 120, in another embodiment the origin router 134 performs direct server return. In the case of FIG. 6, since the source IP address of the packet 444 is an IP address of the client device 110, the origin router 134 transmits the packet directly to the client device 110 (e.g., over the public internet).

FIGS. 1, 4, and 6 describe embodiments where the origin network 130 is separate from the distributed cloud computing network 120 and the origin router 134 is accessible on the public internet. In another embodiment, a Private Network Interconnect (PNI) is established with the distributed cloud computing network 120. In this embodiment, the origin network 130 is directly connected to one or more of the data centers 125A-N such that all traffic is delivered over that private interconnect rather than over the public internet.

Figure 7:
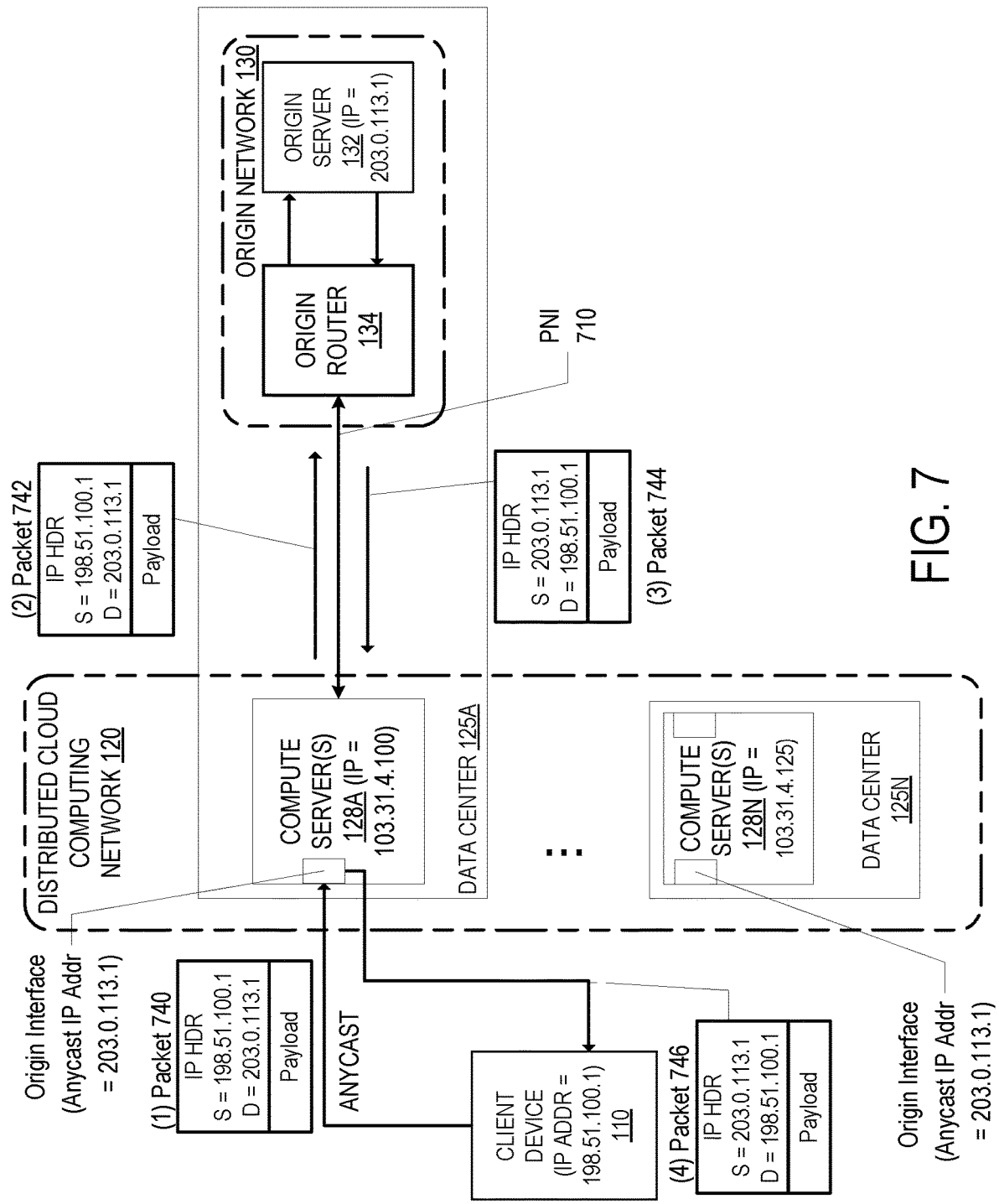
FIG. 7 shows an embodiment where a private network interconnect (PNI) is established between the origin network and the compute server(s) of the data center according to an embodiment.

FIG. 7 shows an embodiment where a PNI is established between the origin network 130 and the compute server(s) 128A of the data center 125A according to an embodiment. The PNI 710 is established between the origin router 134 and a router of the data center 125A that is connected to the compute server(s) 128A (the router of the data center 125A is not shown to not obscure understanding). The PNI 710 may be a physical connection (e.g., a fiber connection) that connects a port of the origin router 134 to a port of the router of the data center 125A. The equipment are typically within the same building. If a client device connects to the data center that has the PNI connection to the origin network, traffic can be simply transmitted to the origin router. However, if a client device connects to a data center that does not have the PNI connection to the origin network, then traffic is encapsulated and transmitted to the data center that is connected to the PNI connection to the origin network. The example shown in FIG. 7 is where a client device connects to the data center that has a PNI connection to the origin network.

At operation 1, the client device 110 (having an IP address of 198.51.100.1) transmits the IP packet 740. The IP packet 740 is destined to the origin server 132 (e.g., it has a destination IP address of 203.0.113.1). The IP packet 740 may be like the IP packet 140. Like FIG. 1, the data center 125A receives the IP packet 740 because it is the closest data center 125 of the data centers 125A-N to the client device 110 according to an Anycast implementation. The data center 125A processes the IP packet 740. In an embodiment where the data center 125A includes multiple compute servers, the IP packet 740 is sent to one of those compute servers for processing like described in FIG. 1. The multiple compute servers may form an equal-cost multi-path (ECMP) group and a router of the data center 125A may determine which compute server will process the IP packet 740. The processing may include performing one or more performance and/or one or more security services as previously described.

The data center 125A has a PNI with the origin network 130. Accordingly, if the compute server 128A determines to transmit the packet to the origin network 130, it may do so directly. Thus, at operation 2, the compute server 128A transmits the IP packet 742 to the origin network 130 over the PNI 710. The IP packet 742 may include as its source IP address the IP address of the client device 110 or the IP address of the compute server 128A. The origin router 134 receives the packet 742 and forwards the packet to the origin server 132. The origin server 132 processes the packet and may transmit a return IP packet 744 that is forwarded by the origin router 134 over the PNI 710 at operation 3. The compute server 128A receives and processes the return packet 744 which may include performing one or more performance and/or one or more security services as previously described. Assuming that the compute server 128A within the data center 125A determines to transmit the packet to the client device 110, the compute server 128A transmits the IP packet 746 to the client device 110 at operation 4. Although FIG. 7 illustrates the packets 742 and 744 being transmitted without an additional IP encapsulation layer, in some embodiments the packets 742 and 744 are further encapsulated (e.g, UDP encapsulated, GRE encapsulated, etc.).

Figure 8:
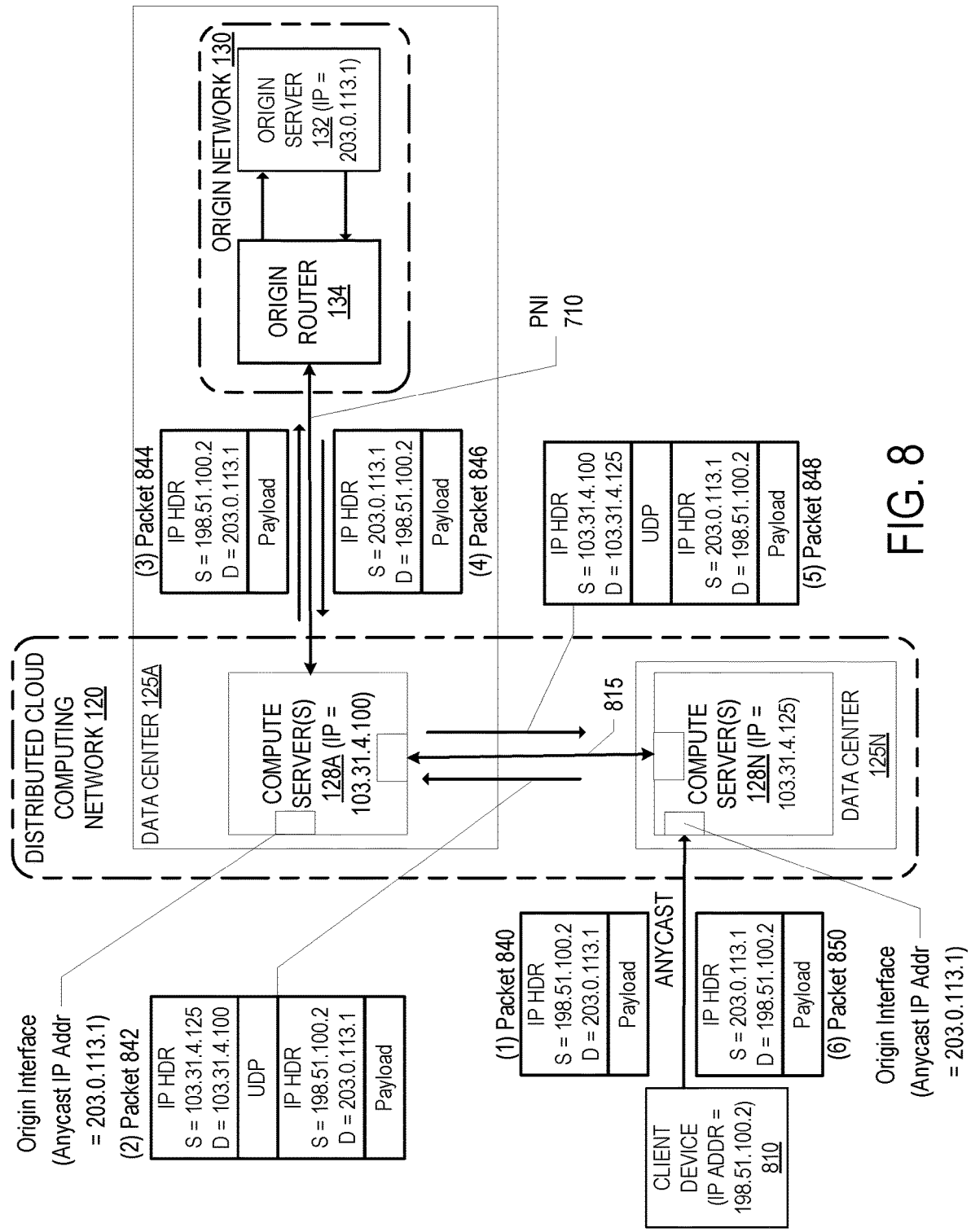
FIG. 8 shows an embodiment where a PNI is established between the origin network and the compute server(s) of the data center according to an embodiment.

FIG. 8 shows an embodiment where a PNI is established between the origin network 130 and the compute server(s) 128A of the data center 125A according to an embodiment. In the example of FIG. 8, a packet is received from a client device at a data center 125 that does not have a PNI connection to the origin network. At operation 1, the client device 810 (having an IP address of 198.51.100.2) transmits the IP packet 840. The IP packet 840 is destined to the origin server 132 (e.g., it has a destination IP address of 203.0.113.1). The IP packet 840 may be like the IP packet 140. The data center 125N receives the IP packet 840 because it is the closest data center 125 of the data centers 125A-N to the client device 810 according to an Anycast implementation. The data center 125N processes the IP packet 840. In an embodiment where the data center 125N includes multiple compute servers, the IP packet 840 is sent to one of those compute servers for processing like described in FIG. 1. The multiple compute servers may form an equal-cost multi-path (ECMP) group and a router of the data center 125N may determine which compute server will process the IP packet 840. The processing may include performing one or more performance and/or one or more security services as previously described. Since the data center 125N does not have a PNI connection to the origin network 130, the packet is encapsulated and transmitted to the data center 125A for transmission to the origin network 130 over the PNI 710.

In an embodiment, the compute server 128A and the compute server 128N have a tunnel 815 that allows traffic to be tunneled between them. For instance, the compute server 128N may lookup the destination IP address of the packet (which in this case is an IP address of the origin server 132) in a routing table and see a next hop for that destination IP address to be of the compute server 128A. The compute server 128N may encapsulate the packet (e.g., in UDP) and transmit the encapsulated packet to the next hop. As shown in FIG. 8, the compute server transmits the encapsulated packet 842 to the compute server 128A. The encapsulated packet 842 includes an outer packet where the outer source and destination IP address correspond to tunnel endpoints between the compute server(s) 128N and 128A. Other encapsulation techniques may be used to transmit the packet between compute servers.

The compute server 128A receives and processes the encapsulated packet 842 including decapsulating the packet. The processing may include performing one or more performance and/or one or more security services as previously described. The data center 125A has a PNI with the origin network 130. Accordingly, if the compute server 128A determines to transmit the packet to the origin network 130, it may do so directly. Thus, at operation 3, the compute server 128A transmits the IP packet 844 to the origin network 130 over the PNI 710. The origin router 134 receives the packet 844 and forwards the packet to the origin server 132. The origin server 132 processes the packet and may transmit a return IP packet 846 that is forwarded by the origin router 134 over the PNI 710 at operation 4. The compute server 128A receives and processes the return packet 846 which may include performing one or more performance and/or one or more security services as previously described. The compute server 128A may transmit the packet directly to the client device 810 or may transmit the packet to the data center 125N for transmission to the client device 810. In the example of FIG. 8, the compute server 128A generates the encapsulated packet 848 and transmits the encapsulated packet 848 over the tunnel 815 to the compute server 128N at operation 5. The compute server 128N receives and processes the packet including decapsulating the encapsulated packet 848. The compute server 128N may perform other processing on the packet including performing one or more performance and/or one or more security services as previously described. Assuming that the compute server 128N determines to transmit the packet to the client device 810, the compute server 128N transmits the IP packet 850 to the client device 810 at operation 6. Although FIG. 8 illustrates the packets 844 and 846 being transmitted without an additional IP encapsulation layer, in some embodiments the packets 844 and 846 are further encapsulated (e.g, UDP encapsulated, GRE encapsulated, etc.).

Figure 9:
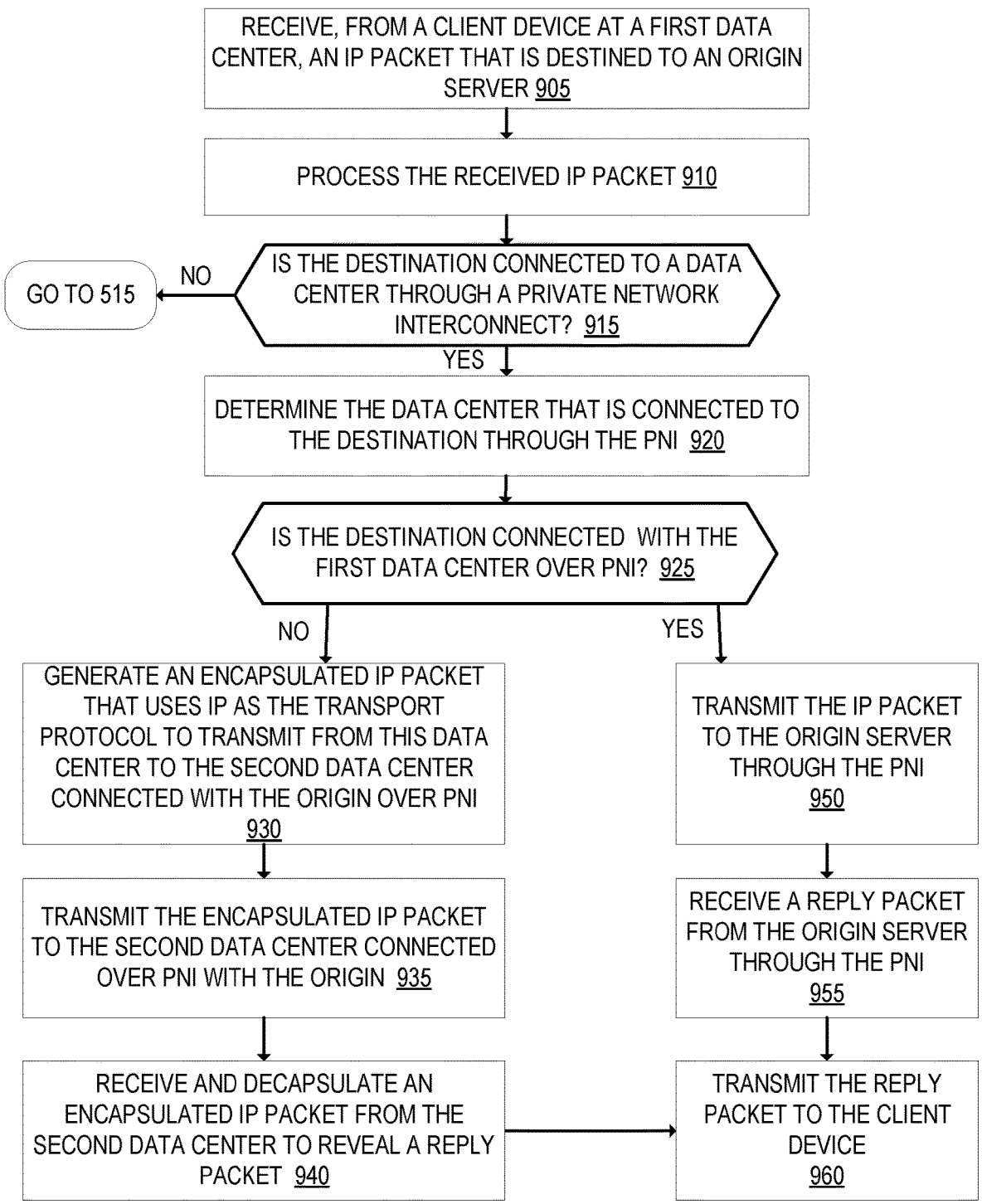
FIG. 9 is a flow diagram that illustrates exemplary operations for a network layer performance and security service provided by a distributed cloud computing network according to an embodiment.

FIG. 9 is a flow diagram that illustrates exemplary operations for a network layer performance and security service provided by a distributed cloud computing network according to an embodiment. The operations of FIG. 9 are described with reference to the exemplary embodiment of FIGS. 7 and 8. However, the operations of FIG. 9 can be performed by embodiments other than those discussed with reference to FIGS. 7 and 8, and the embodiments discussed with reference to FIGS. 7 and 8 can perform operations different than those discussed with reference to FIG. 9.

At operation 905, an IP packet is received from a client device at a first data center 125A of the data centers 125A-N. The IP packet is destined to an IP address that belongs to an origin server. Each of the data centers 125A-N advertise the IP address (or IP address prefix that includes the IP address) as an anycast IP address instead of that IP address being advertised by the origin server. This causes IP packets destined to that IP address to be instead received at one of the data centers 125A-N. The first data center 125A receives the IP packet as a result of an anycast determination that the first data center 125A is closest to the client device out of the data centers 125A-N.

Next, at operation 910, the received IP packet is processed by a compute server 128A of the first data center 125A. In an embodiment, processing the received IP packet includes performing one or more performance services and/or one or more security services as previously described. In an embodiment, the compute server 128A dynamically determines which one or more performance services and/or one or more security services to perform based on information of, or associated with, the IP packet. For instance, a customer may configure which service(s) to apply to which IP address(es) and/or type of IP packet received. The compute server 128A accesses this configuration to determine if and what service(s) to apply to the received packet. Processing the received IP packet may determine that bidirectional flow processing is desired (e.g., the same compute server processing the ingress and egress). The compute server 128A may terminate the TCP/UDP connection with the client device and establish a TCP/UDP connection with the origin network 130. The processing of the packet may be done in multiple stages, as is further described in FIG. 11 for instance.

If it is determined to transmit the IP packet to the origin network, then operation 915 is performed. At operation 915, the compute server 128A determines if the destination is connected to one of the data centers 125A-N through a private network interconnect (PNI). For instance, the compute server 128A may use the destination IP address of the received IP packet to lookup whether the origin network is connected to one of the data centers 125A-N through a PNI and which one or more data centers 125A-N (if any) is connected through PNI. If the destination is not connected to one of the data centers 125A-N through a PNI, then operations starting at operation 515 of FIG. 5 are performed. If the destination is connected to one of the data centers 125A-N, then operation 920 is performed to determine which data center 125 is connected to the destination through a PNI.

If the data center that is connected with the origin network through a PNI is this data center (e.g., the data center 125A), then the packet can be sent to the origin router 134 directly through the PNI connection. Thus, at operation 950, the compute server 128A transmits the IP packet to the origin server 132 (though the origin router 134) using the PNI connection. The origin network will process the IP packet and may transmit a reply packet. Next, at operation 955, the compute server 128A of the data center 125A receives a reply packet from the origin server 132 (through the origin router 134) through the PNI connection. The compute server 128A may process the reply packet including performing or more performance services and/or one or more security services before transmitting the reply packet to the client device. Next, at operation 960, the compute server 128A transmits the reply IP packet to the client device 110.

If the data center that is connected with the origin network is a different data center (a second one of the data centers 125B-N), the operation 930 is performed. At operation 930, the first data center 125A generates an encapsulated IP packet that uses IP as the transport protocol to transmit the processed IP packet from the client device to the second data center that is connected to the origin network over a PNI connection. By way of example, the encapsulation protocol may be UDP, GRE, IP in IP, IPSec, L2TP, VXLAN, or other encapsulation. The IP header of the outer packet has a destination IP address of the second data center that is connected to the origin network over the PNI connection. The source IP address of the outer packet may be the IP address of the first data center. The source IP address of the inner packet may be the IP address of the client device or may be changed to an IP address of the data center (e.g., the anycast IP address of the origin prefix advertised by the data centers). Next, at operation 925, the first data center transmits the encapsulated IP packet to the second data center. The second data center receives and processes the encapsulated IP packet including decapsulating the encapsulated IP packet to reveal the processed IP packet. The second data center may further process the IP packet including performing one or more performance and/or one or more security services as previously described. Assuming that the second data center determines to transmit the IP packet to the origin, the second data center transmits the encapsulated IP packet to the origin over the PNI connection at operation 935. The origin network will process the IP packet and may transmit a reply packet over the PNI connection that is received by the second data center. The second data center processes the reply packet including performing one or more performance and/or one or more security services as previously described. Assuming that the second data center determines to transmit the IP packet toward the client device, the second data center generates an encapsulated IP packet that uses IP as the transport protocol to transmit the processed reply packet from the second data center to the first data center. Thus, at operation 940, the first data center receives and processes the encapsulated IP packet from the second data center including decapsulating the IP packet to reveal the reply IP packet. The first data center may further process the reply IP packet including performing one or more performance and/or one or more security services as previously described. Assuming that the first data center determines to transmit the processed reply IP packet to the client device, at operation 960, the compute server 128A transmits the reply IP packet to the client device 110.

Figure 10:
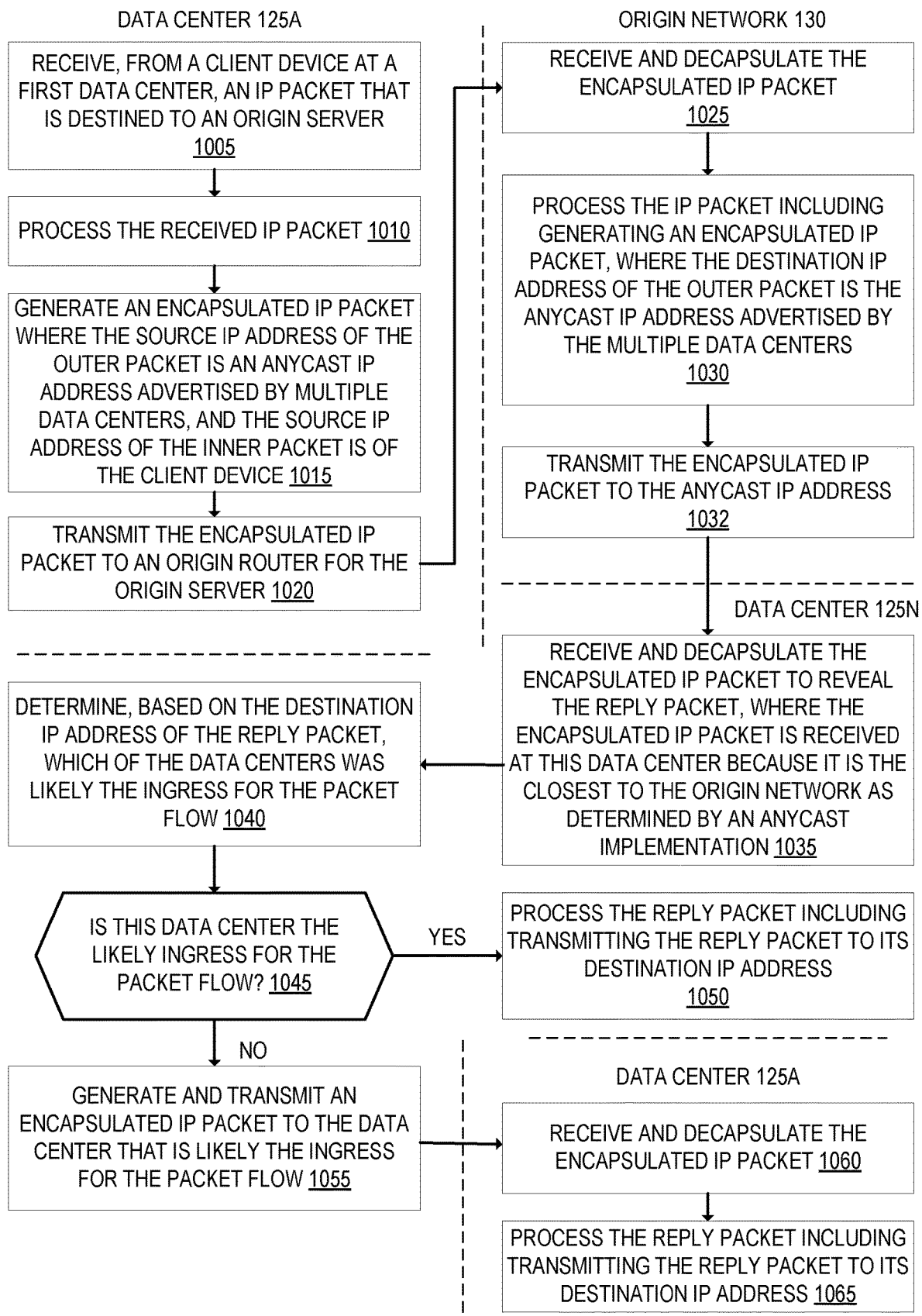
FIG. 10 is a flow diagram that illustrates exemplary operations for a network layer performance and security service provided by a distributed cloud computing network according to an embodiment.

FIG. 10 is a flow diagram that illustrates exemplary operations for a network layer performance and security service provided by a distributed cloud computing network according to an embodiment. The operations of FIG. 10 are described with reference to the exemplary embodiment of FIG. 6. However, the operations of FIG. 10 can be performed by embodiments other than those discussed with reference to FIG. 6, and the embodiments discussed with reference to FIG. 6 can perform operations different than those discussed with reference to FIG. 10.

At operation 1005, an IP packet is received from a client device at a first data center 125A of the data centers 125A-N. The IP packet is destined to an IP address that belongs to an origin server. Each of the data centers 125A-N advertise the IP address (or IP address prefix that includes the IP address) as an anycast IP address instead of that IP address being advertised by the origin server. This causes IP packets destined to that IP address to be instead received at one of the data centers 125A-N. The first data center 125A receives the IP packet as a result of an anycast determination that the first data center 125A is closest to the client device out of the data centers 125A-N.

Next, at operation 1010, the received IP packet is processed by a compute server 128A of the first data center 125A. In an embodiment, processing the received IP packet includes performing one or more performance services and/or one or more security services as previously described. In an embodiment, the compute server 128A dynamically determines which one or more performance services and/or one or more security services to perform based on information of, or associated with, the IP packet. For instance, a customer may configure which service(s) to apply to which IP address(es) and/or type of IP packet received. The compute server 128A accesses this configuration to determine if and what service(s) to apply to the received packet. Processing the received IP packet may determine that bidirectional flow processing is desired (e.g., the same compute server processing the ingress and egress). The compute server 128A may terminate the TCP/UDP connection with the client device and establish a TCP/UDP connection with the origin network 130. The processing of the packet may be done in multiple stages, as is further described in FIG. 11 for instance.

If it is determined to transmit the IP packet to the origin network, then operation 1015 is performed. At operation 1015, the compute server 128A generates an encapsulated IP packet that uses IP as the transport protocol. In a specific example, the encapsulated IP packet is a GRE encapsulated IP packet. The inner packet of the encapsulated IP packet is the result of the processed IP packet and the source IP address is of the client device. The outer packet of the encapsulated IP packet has a source IP address that is an anycast IP address advertised by each of the compute server(s) 128A-N at each of the data centers 125A-N and can be used as a tunneling endpoint on each of the compute server(s) 128A-N. The outer packet of the encapsulated IP packet as a destination IP address of an IP address of the origin router 134 (e.g., a publicly routable IP address of the origin router 134).

Next, at operation 1020, the compute server 128A transmits the encapsulated IP packet to the IP address of the origin router 134. At operation 1025, the origin router 134 of the origin network 130 receives and decapsulates the encapsulated IP packet. The origin router 134 transmits the inner packet to the origin server 132 for further processing. The origin server 132 processes the inner packet and may respond with a reply packet. The reply packet is received at the origin router 134. At operation 1030, the IP packet is processed including generating an encapsulated IP packet that uses IP as the transport protocol (e.g., a GRE encapsulated IP packet). The inner packet of the encapsulated IP packet is the reply packet from the origin server 132. The inner packet has a source IP address of the origin server 132. The inner packet has a destination IP address of the client device 110. The outer packet of the encapsulated reply IP packet has a source IP address of the origin router 134 (the tunnel endpoint address of the origin router 134) and has a destination IP address of the anycast IP address (the tunnel endpoint address of the compute server(s) 128A-N. Next, at operation 1032, the encapsulated IP packet is transmitted to the anycast IP address of the compute server(s) 128A-N.

As previously described, since the tunnel endpoint for the compute server(s) 128A-N is an anycast IP address, the particular data center 125 of the data centers 125A-N that receives the encapsulated return IP packet at the tunnel endpoint is the one closest to the origin router 134 according to an anycast implementation as determined by the network infrastructure between the origin router 134 and the data centers 125A-N. The operations in FIG. 10 describe this situation. Thus, at operation 1035, the encapsulated return IP packet is received at a second data center 125N out of the data centers 125A-N. This return IP packet is received at the data center 125N as a result of an anycast implementation determination that the data center 125N is closest to the origin network 130 out of the data centers 125A-N. A compute server 128N of the data center 125N decapsulates the encapsulated IP packet revealing the inner IP packet (the reply packet from the origin server 132).

Next, at operation 1040, the compute server 128N determines, based on the destination IP address of the reply packet (which is the IP address of the client device 110), which of the data centers 125A-N was likely the ingress data center for the packet flow (e.g., has the highest probability according to a visitor probability map). For instance, the compute server 128N uses a visibility probability map (e.g., keyed by the destination IP address of the reply packet) to determine which of the data centers 125A-N was likely the ingress data center for the packet flow (the data center that received the IP packet from the client device). In an embodiment, the compute server 128N selects the data center that has the highest probability. In another embodiment, the compute server 128N selects the data center that has the highest probability of those that exceed a threshold. Next, at operation 1045, the compute server 128N determines if it is the data center that was the likely ingress for the packet flow (e.g., if it has the highest probability according to the visitor probability map). If it is, then operation 1050 is performed where the compute server 128N processes the reply packet (which may include performing one or more performance services and/or one or more security services as previously described) and transmits the reply packet to the client device 110. If the data center 125N is not the likely ingress data center for the packet flow, then operation 1055 is performed.

At operation 1055, the compute server 128N generates and transmits an encapsulated IP packet to the data center that is likely the ingress data center for the packet flow. In this example, the data center 125A is the likely ingress data center for the packet flow. The compute server 128N encapsulates the inner IP packet, which includes the reply packet, inside an outer packet (e.g., an outer UDP packet) as illustrated in the encapsulated packet 650. The outer packet has a source IP address of the compute server 128N and a destination IP address of the compute server 128A. The inner packet has a source IP address of the origin server 132 and a destination IP address of the client device 110.

At operation 1060, a compute server 128A of the data center 125A receives the encapsulated packet sent from the compute server 128N and decapsulates the encapsulated IP packet to reveal the reply IP packet. The compute server 128N then, at operation 1065, processes the reply packet, which may include performing one or more performance services and/or one or more security services as previously described, and assuming that it decides to transmit the reply to the client device, transmits the reply packet to the client device 110.

Figure 11:
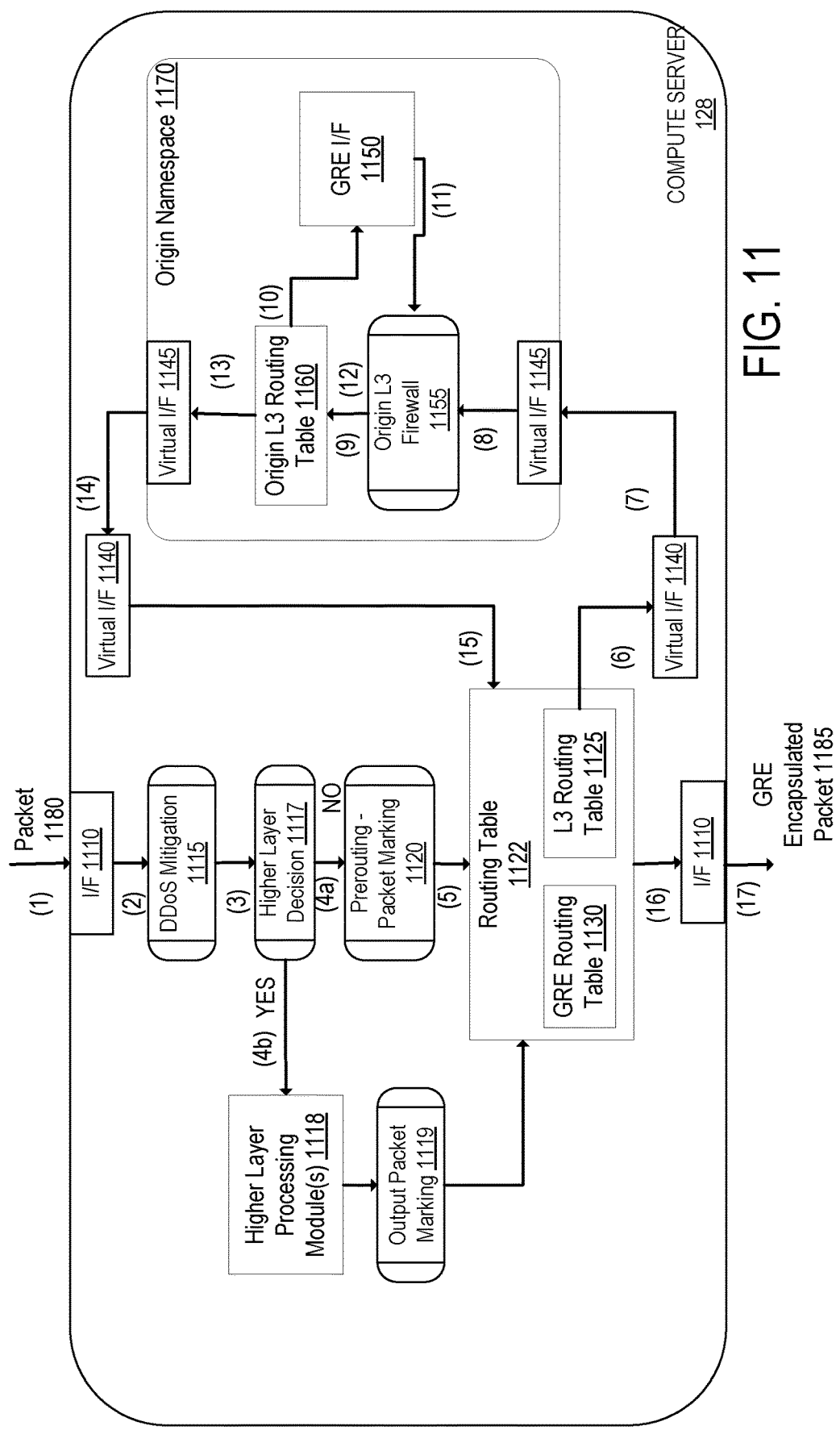
FIG. 11 shows a packet flow through a compute server according to an embodiment.

FIG. 11 shows a packet flow through a compute server 128 according to an embodiment. The packet flow shown in FIG. 11 is for an IP packet received from a client device such as the client device 110 and destined to an origin network such as the origin network 130. For instance, the packet flow of FIG. 11 may be processed by the compute server 128A of the data center 125A. The IP packet 1180 is received at an interface 1110 at operation 1, which may be an ext0 interface. The interface 1110 is shown twice in FIG. 11, once for incoming packet and once for an outgoing packet. The IP packet 1180 may be like the packet 140. At operation 2, the packet flows through the DDoS mitigation module 1115 where DDoS mitigation occurs. Assuming that the packet is not dropped, next at operation 3, a higher layer decision process 1117 is performed to determine and dispatch packets that will be processed with higher layer processing (e.g., L4 and/or L7 processing). For instance, the higher layer decision process 1117 may match the destination IP address and port of the IP packet as one eligible for higher layer processing. If higher layer processing is determined, the higher layer decision process 1117 dispatches the packet to one or more higher layer processing modules 1118 to perform the higher layer processing at operation 4b. The higher layer processing module(s) 1118 may include a processing module for layer 4 (e.g., TCP/UDP), and/or a processing module for layer 7 (e.g., HTTP/S). A packet that has been determined to be transmitted to the origin network (leaving the higher layer processing module(s) 1118) are marked in the output packet marking chain 1119, and then are treated like non-higher layer processing packets. If the packet is not to be processed with higher layer processing, then at operation 4a the packet is marked by the prerouting packet marking module 1120 to indicate that the packet is destined for the origin network 130. Next, at operation 5, the packet is processed at the routing table 1122 (e.g., in the default namespace). A routing rule in the routing table 1122 specifies that marked packets are to use the L3 routing table 1125 at operation 6. The L3 routing table 1125 maps origin prefixes to the appropriate virtual interface for the origin namespace 1170. In this case, the L3 routing table 1125 has been configured with a next hop of the virtual interface 1140 for the origin's IP prefix. The packet exists the network stack on the virtual interface 1140 at operation 7 and then is inserted into the network stack inside the origin namespace 1170 via the virtual interface 1145. The packet then flows through the origin L3 firewall module 1155 at operation 8. The origin L3 firewall module 1155 is configured with firewall rules configured by or for the origin. Assuming that the packet is not filtered by the origin L3 firewall module 1155 and it is determined to send the packet to the origin network, the packet is processed with the origin L3 routing table 1160 at operation 9. The origin L3 routing table 1160 is configured based on BGP advertisements from the origin network. In this case, the origin L3 routing table 1160 indicates that the next hop is the GRE interface 1150 and the packet is transmitted to the GRE interface 1150 at operation 10. The GRE interface 1150 encapsulates the IP packet inside an outer GRE packet according to the configuration of the GRE interface 1150. For instance, with respect to FIG. 1, the outer GRE packet includes a source IP address of a GRE endpoint of the compute server 128A and a destination IP address of the GRE endpoint of the origin router 134. As previously described, the IP address of the GRE endpoint of the compute server 128A may be an anycast IP address that is also advertised by the other compute servers of the data centers 125A-N. The packet is now GRE encapsulated and is inserted back at the top of the network stack by the GRE interface 1150. The GRE encapsulated packet is then sent to the origin L3 firewall module 1155 at operation 11 for further processing (or directly to the origin L3 routing table 1160). Assuming the GRE encapsulated packet is not filtered by the origin L3 firewall module 1155 and it is determined to send the GRE encapsulated packet to the origin network, the GRE encapsulated packet is processed with the origin L3 routing table 1160 at operation 12. The origin L3 routing table is configured with a default route of a next hop of the virtual interface 1145 and sent to the virtual interface 1145 at operation 13. The GRE encapsulated packet exits the origin namespace 1170 and is inserted into the top of the network stack in the default namespace by the virtual interface 1140 at operation 14. The GRE encapsulated packet is processed using the routing table 1122 at operation 15 that indicates it should be sent out through the interface 1110 at operation 16. The GRE encapsulated packet 1185 exits the interface 1110 and sent to the origin router 134 at operation 17.

Figure 12:
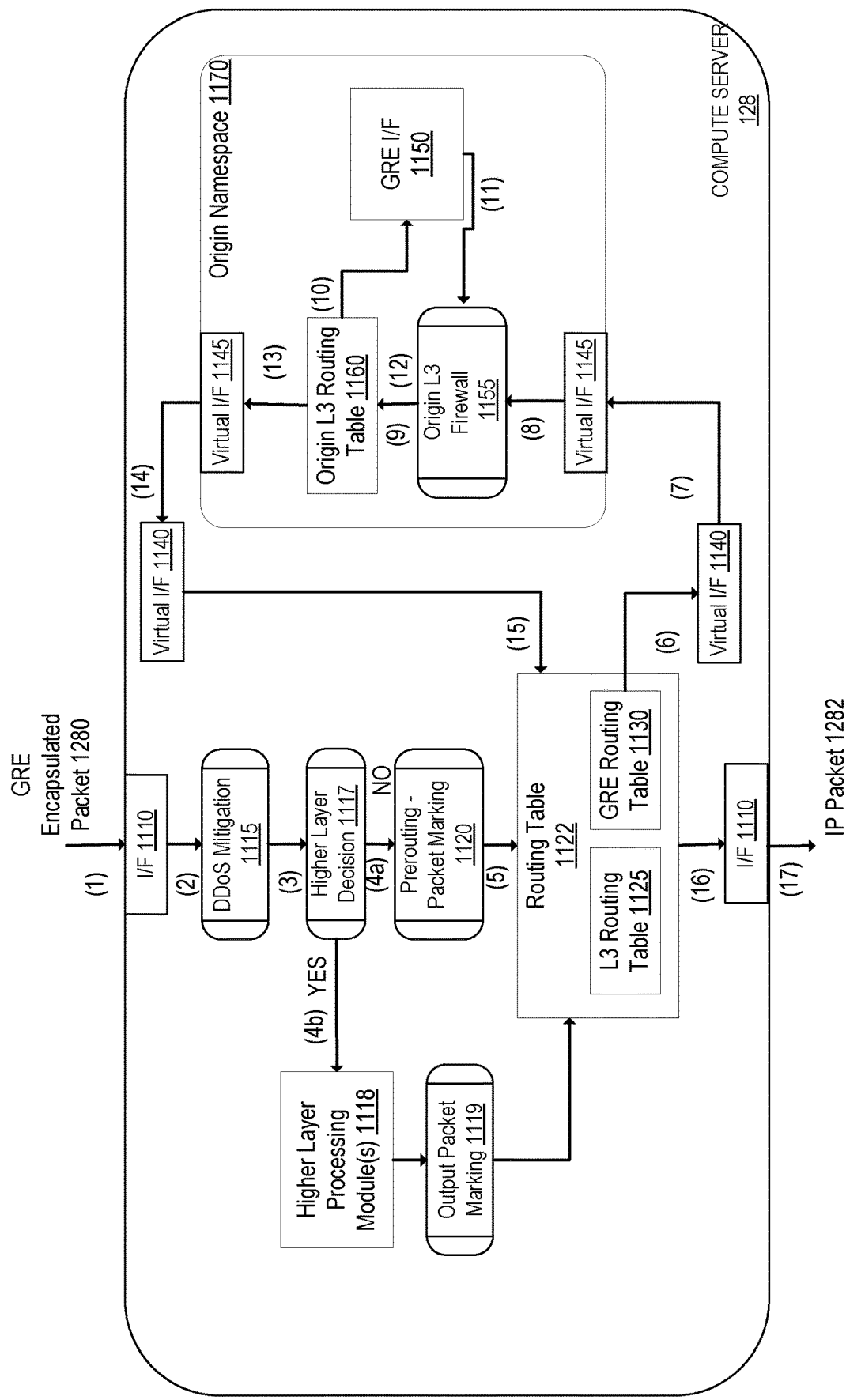
FIG. 12 shows a packet flow through a compute server 128 according to an embodiment.

FIG. 12 shows a packet flow through a compute server 128 according to an embodiment. The packet flow shown in FIG. 12 is for a GRE-encapsulated packet received at the compute server 128 (e.g., from an origin router 134). For instance, the packet flow of FIG. 12 may be processed by the compute server 128N of the data center 125N. The GRE-encapsulated packet 1280 is received at an interface 1110 at operation 1, which may be an ext0 interface. The interface 1110 is shown twice in FIG. 12, once for an incoming packet and once for an outgoing packet. The GRE encapsulated packet 1280 may be like the packet 148. At operation 2, the packet flows through the DDoS mitigation module 1115 where DDoS mitigation occurs. Assuming that the packet is not dropped, next at operation 3, a higher layer decision process 1117 is performed to determine and dispatch packets that will be processed with higher layer processing (e.g., L4 and/or L7 processing). For instance, the higher layer decision process 1117 may match the destination IP address and port of the IP packet as one eligible for higher layer processing. If higher layer processing is determined, the higher layer decision process 1117 dispatches the packet to one or more higher layer processing modules 1118 to perform the higher layer processing at operation 4b. The higher layer processing module(s) 1118 may include a processing module for layer 4 (e.g., TCP/UDP), and/or a processing module for layer 7 (e.g., HTTP/S). A packet that has been determined to be transmitted to the client device 110 are marked in the output packing marking chain 1119 and then are treated like non-higher layer processing packets. If the packet is not to be processed with higher layer processing, then at operation 4a the packet is marked by the prerouting packet marking module 1120 to indicate that the packet is destined for the client device 110. Next, at operation 5, the packet is processed at the routing table 1122 (e.g., in the default namespace). A routing rule in the routing table 1122 specifies that packets destined by an anycast GRE prefix are to use the GRE routing table 1130 assigned to the virtual interface for the origin's namespace, at operation 6 In this case, the GRE routing table 1130 is configured with a next hop of the virtual interface 1140 for the specific destination address of the GRE-encapsulated packet. The packet exists the network stack on the virtual interface 1140 at operation 7 and then is inserted into the network stack inside the origin namespace 1170 via the virtual interface 1145. The packet then flows through the origin L3 firewall module 1155 at operation 8. The origin L3 firewall module 1155 is configured with firewall rules configured by or for the origin. Assuming that the packet is not filtered by the origin L3 firewall module 1155 and it is determined to send the packet to the client device, the packet is processed with the origin L3 routing table 1160 at operation 9. The origin L3 routing table 1160 is configured based on BGP advertisements from the origin network. In this case, the origin L3 routing table 1160 indicates that the next hop is the GRE interface 1150 and the packet is transmitted to the GRE interface 1150 at operation 10. The GRE interface 1150 decapsulates the GRE-encapsulated packet to reveal the inner IP packet. The IP packet is inserted back at the top of the network stack by the GRE interface 1150. The IP packet is then sent to the origin L3 firewall module 1155 at operation 11 for further processing. Assuming the IP packet is not filtered by the origin L3 firewall module 1155 and it is determined to send the IP packet to the client device, the IP packet is processed with the origin L3 routing table 1160 at operation 12. The origin L3 routing table is configured with a default route of a next hop of the virtual interface 1145 and sent to the virtual interface 1145 at operation 13. The IP packet exits the origin namespace 1170 and is inserted into the top of the network stack in the default namespace by the virtual interface 1140 at operation 14. The IP packet is processed using the routing table 1122 at operation 15 that indicates it should be sent out through the interface 1110 at operation 16. The IP packet 1282 exits the interface 1110 and sent to the destination at operation 17. In cases where the compute server 128 transmits an encapsulated packet to another data center for further processing (e.g., the compute server 128N transmitting the encapsulated packet 650 to the compute server 128A, the compute server 128N transmitting the encapsulated packet 848 to the compute server 128A), the routing table 1122 in operation 15 may indicate a next hope of an interface to encapsulate the packet for transmission to a different data center.

Embodiments have been described where IP packets are sent in a tunnel (e.g., GRE) to the origin network over the public internet. The route in which the IP packets (e.g., from the initial encapsulating data center to the origin network) may be determined by conventional routing protocols such as standard BGP, or in some embodiments, intelligently routed through one or more intermediary data centers intermediary data centers based on a set of factor(s) such as latency, speed, reliability, and or cost. For instance, in an embodiment, one of the performance and/or security services that can be performed is intelligently routing the IP packet to an origin network and/or intelligently routing the IP packet from an origin network to the client device.

Figure 13:
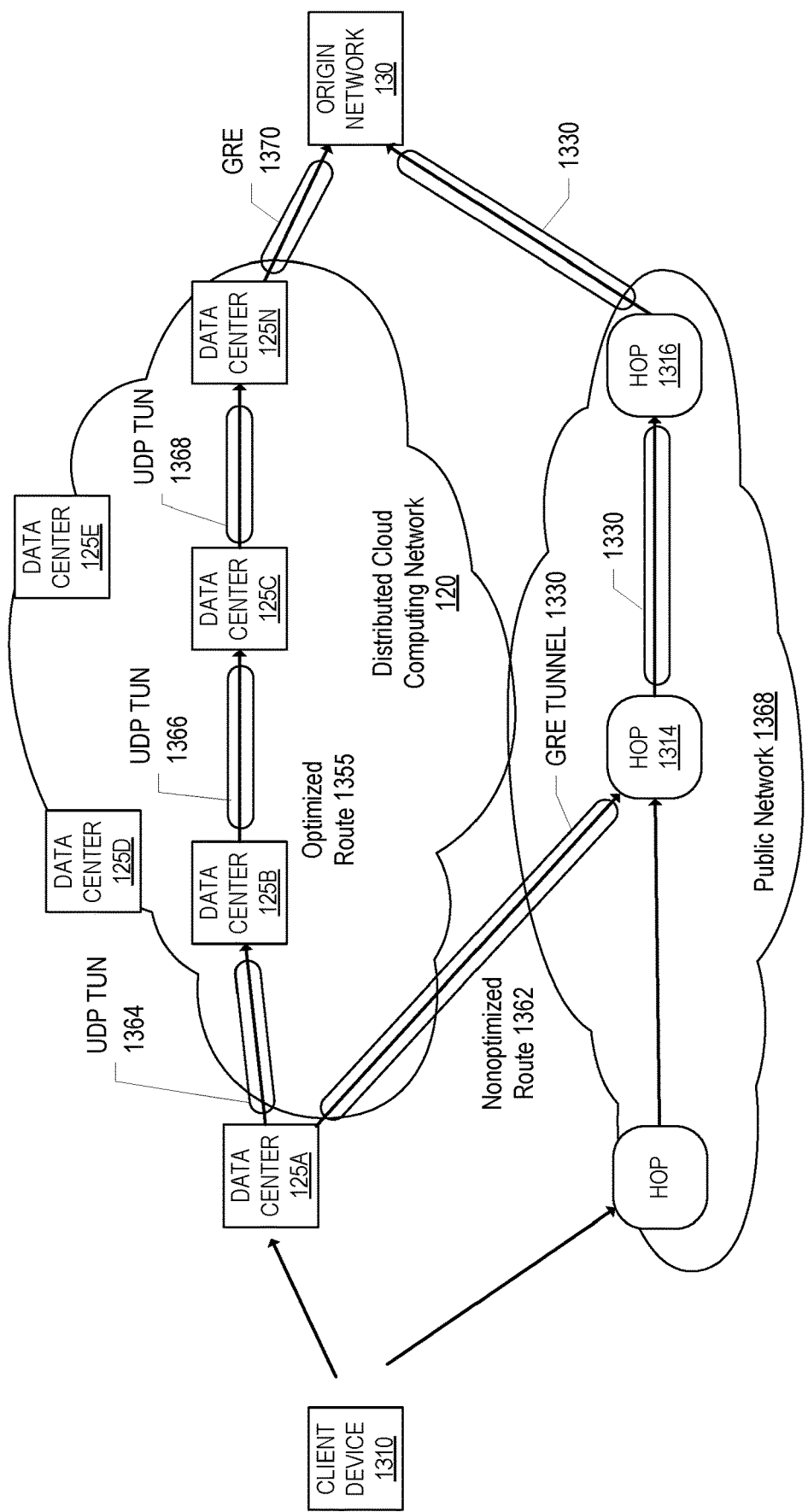
FIG. 13 illustrates an example of IP packets intelligently routed according to an embodiment.

FIG. 13 illustrates an example of IP packets intelligently routed according to an embodiment. IP traffic may traverse the internet between the data centers 125A-N. There may be multiple network providers that provide transit connections between the data centers 125A-N. The different transit connections may have different properties (e.g., different performance characteristics such as latency, speed, and/or reliability; and cost). An optimized route between the entry data center and the exit data center may be determined and used. The entry data center is the data center that initially receives the IP traffic and the exit data center is the data center that is connected with the origin network (e.g., with a tunnel such as a GRE tunnel as described herein).

For instance, with respect to FIG. 13, the data center 125A is the entry data center (it receives the IP traffic from the client device 1310) and the data center 125N is the exit data center (it is the last data center of the data centers 125A-N to the origin network 130) of the optimized route. The optimized route may be based on a set of factors such as latency, speed, reliability, and/or cost, for each of the transit connections. The optimized route may not be the same as the route taken by conventional routing protocols such as standard BGP. For instance, FIG. 13 illustrates a nonoptimized route 1362 from the data center 125A (the entry data center) going through the hops (internet nodes) 1314 to 1316 of the public network 1368 (e.g., the public internet) to the origin network 130. As illustrated in FIG. 13, the IP traffic for the nonoptimized route is carried through the GRE tunnel 1330 from the data center 125A to the origin network 130, traversing the hops 1314 and 1316. The nonoptimized route 1362 may be determined based on conventional routing protocols such as standard BGP. By way of example, with reference to FIG. 1, the packet 142 may traverse from the data center 125A to the origin network 130 over a nonoptimized route like that of the nonoptimized route 1362.

FIG. 13 also illustrates the optimized route 1355 that goes from the data center 125A to the data center 125B to the data center 125C to the data center 125N to the origin network 130. Not all of the data centers 125A-N are necessarily part of the optimized route. For instance, the data centers 125D-E are not part of the optimized route. In an embodiment, the IP packets are encapsulated (e.g., using UDP) for transit between the data centers on the optimized route and include information that aids in routing.

In an embodiment, the encapsulating header includes the full path the IP packet should traverse through the distributed cloud computing network 120. The full path can be encoded as a list of hops where each hop is an identifier of a data center 125 (e.g., not a full IP address). In this embodiment, the entry data center 125 determines the full path (e.g., looks up the path in optimized route storage based on the destination address) and encodes the full path in the encapsulating header. Each intermediate data center 125 can then use the path encoded in the encapsulating header to route the IP traffic instead of accessing the optimized route storage to determine the next hop.

In an embodiment, the encapsulating header includes a hash or identifier of the full path that is stored in optimized route storage on each of the data centers 125A-N that is keyed by the hash or identifier. In such an embodiment, the entry data center 125 determines the full path (e.g., looks up the path in optimized route storage based on the destination address) and encodes the hash or identifier in the encapsulating header. Each intermediate data center can then use the encoded hash or identifier to determine the path.

In an embodiment, the encapsulating header includes a hash or other identifier that represents a specific routing policy (e.g., stored in optimized route storage) that is used for the optimized route. For instance, a routing policy may be: fastest by latency, lowest jitter, lowest packet loss, cheapest by bandwidth, data sovereignty policies (e.g., don't route through a particular geographic region), etc. In such an embodiment, the entry data center 125 determines the routing policy to apply (e.g., looks up the routing policy in the optimized route storage based on the destination address and/or source address), and includes the hash or other identifier in the metadata of the encapsulating header. This allows each data center of the optimized route to consistently apply the same routing polic(ies).

In an embodiment, the encapsulating header includes a hash or other identifier of the origin network 130 (e.g., a hash or other identifier of the IP address of the origin server 132 and/or origin router 134). For instance, in some embodiments, the IP packet is encrypted (including the source and destination IP address). Each data center 125 could decrypt the packet to determine the destination IP address. However, since decrypting/encrypting can be expensive, the hash or other identifier can be used to lookup the next hop without having to decrypt the encrypted payload.

As illustrated in FIG. 13, a tunnel 1364 is established between the data centers 125A and 125B (e.g., the UDP tunnel 1364), a tunnel 1366 is established between the data centers 125B and 125C (e.g., the UDP tunnel 1366), and a tunnel 1368 is established between the data centers 125C and 125N (e.g., the UDP tunnel 1368). Since the data center 125N is the exit data center, it transmits the IP packets over the GRE tunnel 1370 to the origin network 130.

Figure 14:
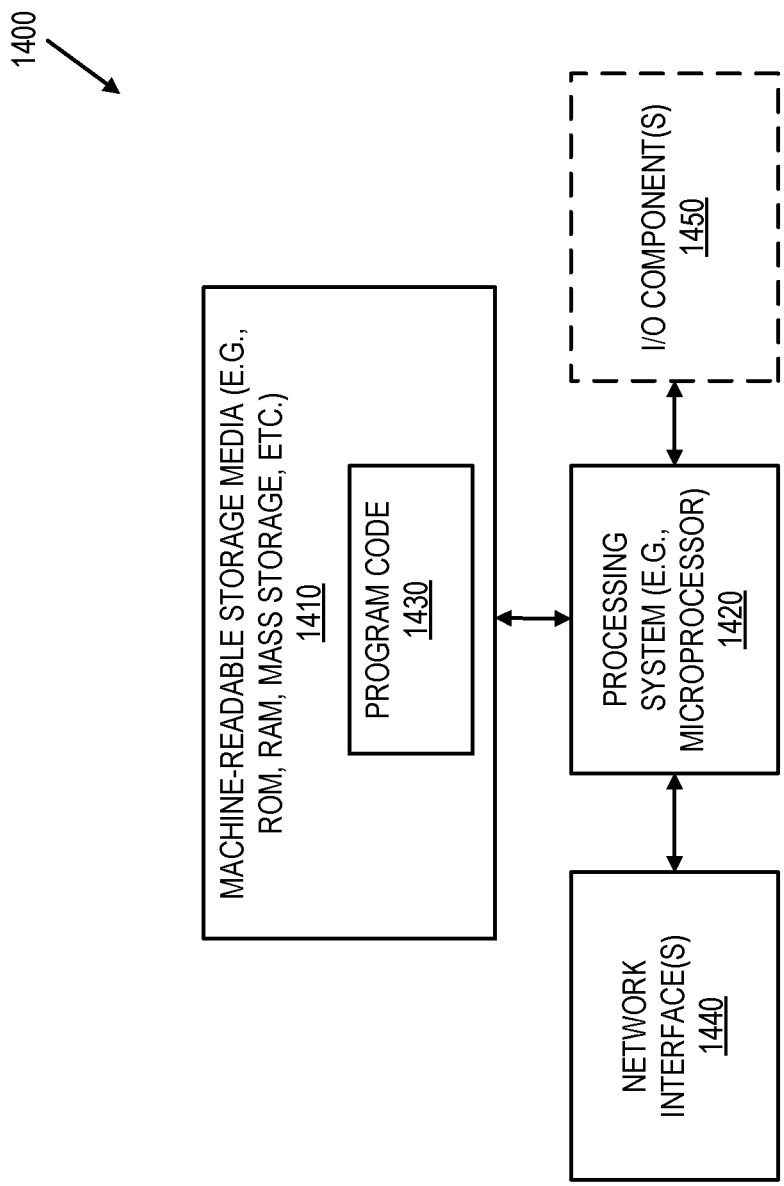
FIG. 14 illustrates a block diagram for an exemplary data processing system that may be used in some embodiments.

FIG. 14 illustrates a block diagram for an exemplary data processing system 1400 that may be used in some embodiments. One or more such data processing systems 1400 may be used to implement the embodiments and operations described with respect to the compute servers or other computing devices. The data processing system 1400 is a computing device that stores and transmits (internally and/or with other computing devices over a network) code (which is composed of software instructions and which is sometimes referred to as computer program code or a computer program) and/or data using machine-readable media (also called computer-readable media), such as machine-readable storage media 1410 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 1420 (e.g., one or more processors and connected system components such as multiple connected chips). For example, the depicted machine-readable storage media 1410 may store program code 1430 that, when executed by the processor(s) 1420, causes the data processing system 1400 to perform any of the operations described herein.

The data processing system 1400 also includes one or more network interfaces 1440 (e.g., a wired and/or wireless interfaces) that allows the data processing system 1400 to transmit data and receive data from other computing devices, typically across one or more networks (e.g., Local Area Networks (LANs), the Internet, etc.). The data processing system 1400 may also include one or more input or output ("I/O") components 1450 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 1400, and, in certain embodiments, fewer components than that shown in One or more buses may be used to interconnect the various components shown in FIG. 14.

The techniques shown in the figures can be implemented using code and data stored and executed on one or more computing devices (e.g., a compute server, a client device, a router, an origin server). Such computing devices store and communicate (internally and/or with other computing devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such computing devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth in order to provide a more thorough understanding of the present embodiments. It will be appreciated, however, by one skilled in the art that the invention may be practiced without such specific details. In other instances, control structures, gate level circuits and full software instruction sequences have not been shown in detail in order not to obscure understanding of the embodiments. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a distributed cloud computing network that includes a plurality of computing devices, the method comprising:

configuring a Generic Routing Encapsulation (GRE) tunnel between the plurality of computing devices of the distributed cloud computing network and a single origin router of an origin network, wherein the GRE tunnel between each computing device and the single origin router has a first GRE endpoint that has a same first IP address and a second GRE endpoint that has a second IP address that is a publicly routable IP address of the single origin router;

receiving, from a first client device, a first IP packet at a first one of the plurality of computing devices, wherein the received first IP packet has a first source IP address and a first destination IP address, wherein the first source IP address is a third IP address of the client device, wherein the first destination IP address is a fourth IP address of an origin server of the origin network, wherein the fourth IP address is advertised as a first anycast IP address at the distributed cloud computing network;

processing the received first IP packet at the first computing device;

encapsulating the processed first IP packet inside a first outer packet to generate a first GRE encapsulated packet, wherein the first outer packet has a second source IP address and a second destination IP address, wherein the second source IP address is the first IP address, and wherein the second destination IP address is the second IP address; and transmitting the first GRE encapsulated packet over the GRE tunnel to the second IP address of the single origin router.

2. The method of claim 1, wherein processing the received first IP packet at the first computing device includes performing a distributed denial of service (DDoS) mitigation on the first IP packet.

3. The method of claim 1, wherein the first IP address is a second anycast IP address.

4. The method of claim 3, further comprising:

wherein the second anycast IP address is advertised by each of the computing devices of the distributed cloud computing network;

receiving, at a second one of the plurality of computing devices over the GRE tunnel, a second GRE encapsulated packet from the single origin router in response to the transmitted first GRE encapsulated packet, the second GRE encapsulated packet having been directed to the second anycast IP address;

processing, at the second computing device, the second GRE encapsulated packet including decapsulating the second GRE encapsulated packet to reveal a second IP packet, wherein the second IP packet has a third source IP address and a third destination IP address, wherein the third source IP address is the fourth IP address of the origin server, and wherein the third destination IP address is the third IP address of the first client device; and transmitting, by the second computing device, the second IP packet to the first client device.

5. The method of claim 3, further comprising:

receiving, from a second client device, a second IP packet at the first computing device, wherein the received second IP packet has a third source IP address and a third destination IP address, wherein the third destination IP address is a fifth IP address of a second origin server, wherein the fifth IP address is advertised as a third anycast IP address by the distributed cloud computing network, and wherein the third source IP address is a sixth IP address of the second client device;

processing the received second IP packet at the first computing device;

encapsulating the processed second IP packet inside a second outer packet to generate a second GRE encapsulated packet, wherein the second outer packet has a fourth source IP address and a fourth destination IP address, wherein the second outer packet has the second anycast IP address as the fourth source IP address, wherein the outer packet has a seventh IP address of a second origin router for the second origin server as the fourth destination IP address;

transmitting the second GRE encapsulated packet over the GRE tunnel to the seventh IP address of the second origin router for the second origin server;

receiving, at a second one of the plurality of computing devices over the GRE tunnel, a third GRE encapsulated packet from the second origin router in response to the transmitted second GRE encapsulated packet, the third GRE encapsulated packet being directed to the second anycast IP address;

processing, at the second computing device, the third GRE encapsulated packet including decapsulating the third GRE encapsulated packet to reveal a third IP packet, wherein the third IP packet has a fifth source IP address and a fifth destination IP address, wherein the fifth source IP address is the fifth IP address of the second origin server, and wherein the fifth destination IP address is the sixth IP address of the second client device;

determining, using a probability map based on the fifth destination IP address, that an ingress for a packet flow of the third IP packet is the first computing device, and responsive to this determining, transmitting the third IP packet from the second computing device to the first computing device;

processing, at the first computing device, the third IP packet; and transmitting, by the first computing device, the third IP packet to the second client device.

6. The method of claim 3, further comprising:

receiving, from a second client device, a second IP packet at the first computing device, wherein the received second IP packet has a third source IP address and a third destination IP address, wherein the third destination IP address is a fifth IP address of a second origin server, wherein the fifth IP address is advertised as a third anycast IP address by the distributed cloud computing network, and wherein the third source IP address is a sixth IP address of the second client device;

processing the received second IP packet at the first computing device;

modifying the processed second IP packet by changing the third source IP address of the received second IP packet to a seventh IP address of the first computing device to create a modified third IP packet;

encapsulating the modified third IP packet inside a second outer packet to generate a second GRE encapsulated packet, wherein the second outer packet has a fourth source IP address and a fourth destination IP address, wherein the second outer packet has the second anycast IP address as the fourth source IP address, wherein the outer packet has an eighth IP address of a second origin router for the second origin server as the fourth destination IP address;

transmitting the second GRE encapsulated packet over the GRE tunnel to the eighth IP address of the second origin router for the second origin server;

receiving, at a second one of the plurality of computing devices over the GRE tunnel, a third GRE encapsulated packet from the second origin router in response to the transmitted second GRE encapsulated packet, the third GRE encapsulated packet being directed to the second anycast IP address;

processing, at the second computing device, the third GRE encapsulated packet including decapsulating the third GRE encapsulated packet to reveal a fourth IP packet, wherein the fourth IP packet has a fifth source IP address and a fifth destination IP address, wherein the fifth source IP address is the fifth IP address of the second origin server, and wherein the fifth destination IP address is the seventh IP address of the first computing device;

transmitting the fourth IP packet from the second computing device to the first computing device;

processing, at the first computing device, the fourth IP packet; and transmitting, by the first computing device, the fourth IP packet to the second client device.

7. The method of claim 6, wherein processing the received second IP packet and processing the fourth IP packet include performing layer 4 and/or layer 7 processing.

8. A non-transitory machine-readable storage medium that provides instructions that, when executed by a processor, cause the processor to perform operations comprising:

receiving, from a first client device, a first IP packet at a first one of a plurality of computing devices of a distributed cloud computing network, wherein the received first IP packet has a first source IP address and a first destination IP address, wherein the first source IP address is a first IP address of the client device, wherein the first destination IP address is a second IP address of an origin server of an origin network, wherein the second IP address is advertised as a first anycast IP address at the distributed cloud computing network;

processing the received first IP packet at the first computing device;

encapsulating the processed first IP packet inside a first outer packet to generate a first GRE encapsulated packet, wherein the first outer packet has a second source IP address and a second destination IP address, wherein the second source IP address is a third IP address assigned as a first Generic Routing Encapsulation (GRE) endpoint of a GRE tunnel that is configured on the first computing device and each of the other computing devices of the plurality of computing devices, and wherein the second destination IP address is a fourth IP address of a publicly routable IP address of a single origin router of an origin network that is configured as a second GRE endpoint of the GRE tunnel; and transmitting the first GRE encapsulated packet over the GRE tunnel to the fourth IP address of the single origin router.

9. The non-transitory machine-readable storage medium of claim 8, wherein processing the received first IP packet at the first computing device includes performing a distributed denial of service (DDoS) mitigation on the first IP packet.

10. The non-transitory machine-readable storage medium of claim 8, wherein the third IP address is a second anycast IP address.

11. The non-transitory machine-readable storage medium of claim 10, wherein the operations further comprise:

wherein the second anycast IP address is advertised by each of the computing devices of the distributed cloud computing network;

receiving, at a second one of the plurality of computing devices over the GRE tunnel, a second GRE encapsulated packet from the single origin router in response to the transmitted first GRE encapsulated packet, the second GRE encapsulated packet having been directed to the second anycast IP address;

processing, at the second computing device, the second GRE encapsulated packet including decapsulating the second GRE encapsulated packet to reveal a second IP packet, wherein the second IP packet has a third source IP address and a third destination IP address, wherein the third source IP address is the second IP address of the origin server, and wherein the third destination IP address is the first IP address of the first client device; and transmitting, by the second computing device, the second IP packet to the first client device.

12. The non-transitory machine-readable storage medium of claim 10, wherein the operations further comprise:

receiving, from a second client device, a second IP packet at the first computing device, wherein the received second IP packet has a third source IP address and a third destination IP address, wherein the third destination IP address is a fifth IP address of a second origin server, wherein the fifth IP address is advertised as a third anycast IP address by the distributed cloud computing network, and wherein the third source IP address is a sixth IP address of the second client device;

processing the received second IP packet at the first computing device;

encapsulating the processed second IP packet inside a second outer packet to generate a second GRE encapsulated packet, wherein the second outer packet has a fourth source IP address and a fourth destination IP address, wherein the second outer packet has the second anycast IP address as the fourth source IP address, wherein the outer packet has a seventh IP address of a second origin router for the second origin server as the fourth destination IP address;

transmitting the second GRE encapsulated packet over the GRE tunnel to the seventh IP address of the second origin router for the second origin server;

receiving, at a second one of the plurality of computing devices over the GRE tunnel, a third GRE encapsulated packet from the second origin router in response to the transmitted second GRE encapsulated packet, the third GRE encapsulated packet being directed to the second anycast IP address;

processing, at the second computing device, the third GRE encapsulated packet including decapsulating the third GRE encapsulated packet to reveal a third IP packet, wherein the third IP packet has a fifth source IP address and a fifth destination IP address, wherein the fifth source IP address is the fifth IP address of the second origin server, and wherein the fifth destination IP address is the sixth IP address of the second client device;

determining, using a probability map based on the fifth destination IP address, that an ingress for a packet flow of the third IP packet is the first computing device, and responsive to this determining, transmitting the third IP packet from the second computing device to the first computing device;

processing, at the first computing device, the third IP packet; and transmitting, by the first computing device, the third IP packet to the second client device.

13. The non-transitory machine-readable storage medium of claim 10, wherein the operations further comprise:

receiving, from a second client device, a second IP packet at the first computing device, wherein the received second IP packet has a third source IP address and a third destination IP address, wherein the third destination IP address is a fifth IP address of a second origin server, wherein the fifth IP address is advertised as a third anycast IP address by the distributed cloud computing network, and wherein the third source IP address is a sixth IP address of the second client device;

processing the received second IP packet at the first computing device;

modifying the processed second IP packet by changing the third source IP address of the received second IP packet to a seventh IP address of the first computing device to create a modified third IP packet;

encapsulating the modified third IP packet inside a second outer packet to generate a second GRE encapsulated packet, wherein the second outer packet has a fourth source IP address and a fourth destination IP address, wherein the second outer packet has the second anycast IP address as the fourth source IP address, wherein the outer packet has an eighth IP address of a second origin router for the second origin server as the fourth destination IP address;

transmitting the second GRE encapsulated packet over the GRE tunnel to the eighth IP address of the second origin router for the second origin server;

receiving, at a second one of the plurality of computing devices over the GRE tunnel, a third GRE encapsulated packet from the second origin router in response to the transmitted second GRE encapsulated packet, the third GRE encapsulated packet being directed to the second anycast IP address;

processing, at the second computing device, the third GRE encapsulated packet including decapsulating the third GRE encapsulated packet to reveal a fourth IP packet, wherein the fourth IP packet has a fifth source IP address and a fifth destination IP address, wherein the fifth source IP address is the fifth IP address of the second origin server, and wherein the fifth destination IP address is the seventh IP address of the first computing device;

transmitting the fourth IP packet from the second computing device to the first computing device;

processing, at the first computing device, the fourth IP packet; and transmitting, by the first computing device, the fourth IP packet to the second client device.

14. The non-transitory machine-readable storage medium of claim 13, wherein processing the received second IP packet and processing the fourth IP packet include performing layer 4 and/or layer 7 processing.

15. A first computing device of a plurality of computing devices of a distributed cloud computing network, the first computing device comprising:
a processor; and
a non-transitory machine-readable storage medium that provides instructions that, when executed by the processor, causes the first computing device to perform operations comprising:
receiving, from a first client device, a first IP packet at the first computing device, wherein the received first IP packet has a first source IP address and a first destination IP address, wherein the first source IP address is a first IP address of the client device, wherein the first destination IP address is a second IP address of an origin server of an origin network, wherein the second IP address is advertised as a first anycast IP address at the distributed cloud computing network;

processing the received first IP packet at the first computing device;

encapsulating the processed first IP packet inside a first outer packet to generate a first GRE encapsulated packet, wherein the first outer packet has a second source IP address and a second destination IP address, wherein the second source IP address is a third IP address assigned as a first Generic Routing Encapsulation (GRE) endpoint of a GRE tunnel that is configured on the first computing device and each of the other computing devices of the plurality of computing devices, and wherein the second destination IP address a fourth IP address of a publicly routable IP address of a single origin router of an origin network that is configured as a second GRE endpoint of the GRE tunnel; and transmitting the first GRE encapsulated packet over the GRE tunnel to the fourth IP address of the single origin router.

16. The first computing device of claim 15, wherein processing the received first IP packet at the first computing device includes performing a distributed denial of service (DDoS) mitigation on the first IP packet.

17. The first computing device of claim 15, wherein the third IP address is a second anycast IP address.

18. The first computing device of claim 17, wherein the operations further comprise:
wherein the second anycast IP address is advertised by each of the computing devices of the distributed cloud computing network;
receiving, at a second one of the plurality of computing devices over the GRE tunnel, a second GRE encapsulated packet from the single origin router in response to the transmitted first GRE encapsulated packet, the second GRE encapsulated packet having been directed to the second anycast IP address;
processing, at the second computing device, the second GRE encapsulated packet including decapsulating the second GRE encapsulated packet to reveal a second IP packet, wherein the second IP packet has a third source IP address and a third destination IP address, wherein the third source IP address is the second IP address of the origin server, and wherein the third destination IP address is the first IP address of the first client device; and
transmitting, by the second computing device, the second IP packet to the first client device.

19. The first computing device of claim 17, wherein the operations further comprise:
receiving, from a second client device, a second IP packet at the first computing device, wherein the received second IP packet has a third source IP address and a third destination IP address, wherein the third destination IP address is a fifth IP address of a second origin server, wherein the fifth IP address is advertised as a third anycast IP address by the distributed cloud computing network, and wherein the third source IP address is a sixth IP address of the second client device;
processing the received second IP packet at the first computing device;
encapsulating the processed second IP packet inside a second outer packet to generate a second GRE encapsulated packet, wherein the second outer packet has a fourth source IP address and a fourth destination IP address, wherein the second outer packet has the second anycast IP address as the fourth source IP address, wherein the outer packet has a seventh IP address of a second origin router for the second origin server as the fourth destination IP address;

transmitting the second GRE encapsulated packet over the GRE tunnel to the seventh IP address of the second origin router for the second origin server;

receiving, at a second one of the plurality of computing devices over the GRE tunnel, a third GRE encapsulated packet from the second origin router in response to the transmitted second GRE encapsulated packet, the third GRE encapsulated packet being directed to the second anycast IP address;

processing, at the second computing device, the third GRE encapsulated packet including decapsulating the third GRE encapsulated packet to reveal a third IP packet, wherein the third IP packet has a fifth source IP address and a fifth destination IP address, wherein the fifth source IP address is the fifth IP address of the second origin server, and wherein the fifth destination IP address is the sixth IP address of the second client device;

determining, using a probability map based on the fifth destination IP address, that an ingress for a packet flow of the third IP packet is the first computing device, and responsive to this determining, transmitting the third IP packet from the second computing device to the first computing device;

processing, at the first computing device, the third IP packet; and transmitting, by the first computing device, the third IP packet to the second client device.

20. The first computing device of claim 17, wherein the operations further comprise:

receiving, from a second client device, a second IP packet at the first computing device, wherein the received second IP packet has a third source IP address and a third destination IP address, wherein the third destination IP address is a fifth IP address of a second origin server, wherein the fifth IP address is advertised as a third anycast IP address by the distributed cloud computing network, and wherein the third source IP address is a sixth IP address of the second client device;

processing the received second IP packet at the first computing device;

modifying the processed second IP packet by changing the third source IP address of the received second IP packet to a seventh IP address of the first computing device to create a modified third IP packet;

encapsulating the modified third IP packet inside a second outer packet to generate a second GRE encapsulated packet, wherein the second outer packet has a fourth source IP address and a fourth destination IP address, wherein the second outer packet has the second anycast IP address as the fourth source IP address, wherein the outer packet has an eighth IP address of a second origin router for the second origin server as the fourth destination IP address;

transmitting the second GRE encapsulated packet over the GRE tunnel to the eighth IP address of the second origin router for the second origin server;

receiving, at a second one of the plurality of computing devices over the GRE tunnel, a third GRE encapsulated packet from the second origin router in response to the transmitted second GRE encapsulated packet, the third GRE encapsulated packet being directed to the second anycast IP address;

processing, at the second computing device, the third GRE encapsulated packet including decapsulating the third GRE encapsulated packet to reveal a fourth IP packet, wherein the fourth IP packet has a fifth source IP address and a fifth destination IP address, wherein the fifth source IP address is the fifth IP address of the second origin server, and wherein the fifth destination IP address is the seventh IP address of the first computing device;

transmitting the fourth IP packet from the second computing device to the first computing device;

processing, at the first computing device, the fourth IP packet; and transmitting, by the first computing device, the fourth IP packet to the second client device.

21. The first computing device of claim 20, wherein processing the received second IP packet and processing the fourth IP packet include performing layer 4 and/or layer 7 processing.

* * * * *